(12) United States Patent
Kriss

(10) Patent No.: US 11,402,279 B2
(45) Date of Patent: Aug. 2, 2022

(54) CONTINUOUS CALIBRATION OF SENSORS IN A REMOTELY MONITORED COOLING SYSTEM

(71) Applicant: KLATU NETWORKS, INC., Poulsbo, WA (US)

(72) Inventor: Richard Kriss, Poulsbo, WA (US)

(73) Assignee: KLATU NETWORKS, INC., Poulsbo, WA (US)

(*) Notice: Subject to any disclaimer, the term of this patent is extended or adjusted under 35 U.S.C. 154(b) by 93 days.

(21) Appl. No.: 17/027,690

(22) Filed: Sep. 21, 2020

(65) Prior Publication Data

US 2021/0088247 A1 Mar. 25, 2021

Related U.S. Application Data

(60) Provisional application No. 62/902,849, filed on Sep. 19, 2019, provisional application No. 62/948,292, filed on Dec. 15, 2019.

(51) Int. Cl.
*G01K 15/00* (2006.01)
*F25D 29/00* (2006.01)
(Continued)

(52) U.S. Cl.
CPC ............ *G01K 15/005* (2013.01); *F24F 11/49* (2018.01); *F24F 11/63* (2018.01); *F25D 29/00* (2013.01);
(Continued)

(58) Field of Classification Search
None
See application file for complete search history.

(56) References Cited

U.S. PATENT DOCUMENTS 5,570,300 A * 10/1996 Henry ................... G01F 15/024
702/45
9,909,935 B1 * 3/2018 Biers .................... G01K 15/005
(Continued)

FOREIGN PATENT DOCUMENTS

| JP | 2017156013 A | 9/2017 | |
|---|---|---|---|
| WO | 2013033076 A1 | 3/2013 | |
| WO | WO-2019180325 A1 * | 9/2019 | ............. G01D 18/00 |

OTHER PUBLICATIONS

PCT/US2020/051806. International Search Report & Written Opinion dated (Feb. 3, 2021). 24 pages.
(Continued)

*Primary Examiner* — Raul J Rios Russo
*Assistant Examiner* — Carl F. R. Tchatchouang
(74) *Attorney, Agent, or Firm* — Loza & Loza, LLP; Anthony Smyth

(57) ABSTRACT

Systems, methods and apparatus may be applicable to managing and monitoring refrigeration assets, including refrigeration plants and cold-storage facilities comprising large numbers of refrigeration assets. A method of managing refrigeration systems includes receiving measurements captured by a plurality of sensors deployed with a refrigeration asset, the measurements being related to temperatures within a temperature-controlled chamber of the refrigeration asset, identifying a difference between a first temperature measurement obtained from measurements provided by a first sensor and a second temperature measurement obtained from measurements provided by at least one sensor, and calibrating the first sensor based on the difference between the first temperature measurement and the second temperature measurement.

20 Claims, 19 Drawing Sheets

(51) Int. Cl.
*H04Q 9/00* (2006.01)
*F24F 11/63* (2018.01)
*F24F 11/49* (2018.01)
*F24F 110/10* (2018.01)

(52) U.S. Cl.
CPC ............... *G01K 15/00* (2013.01); *H04Q 9/00* (2013.01); *F24F 2110/10* (2018.01); *F25D 2700/123* (2013.01); *H04Q 2209/40* (2013.01)

(56) References Cited

U.S. PATENT DOCUMENTS

| | | |
|---|---|---|
| 2014/0324388 A1 | 10/2014 | Kriss |
| 2014/0350882 A1 | 11/2014 | Everett et al. |
| 2015/0046364 A1 | 2/2015 | Kriss |
| 2016/0370238 A1 | 12/2016 | Peck, Jr. et al. |
| 2017/0086322 A1 | 3/2017 | Schenkl et al. |
| 2017/0102251 A1* | 4/2017 | Masson .................. H04L 67/12 |
| 2018/0120022 A1 | 5/2018 | Rindlisbach et al. |
| 2019/0033862 A1 | 1/2019 | Groden et al. |
| 2019/0135300 A1 | 5/2019 | Gonzalez Aguirre et al. |

OTHER PUBLICATIONS

PCT/US2020/051806. International Preliminary Report on Patentability dated Mar. 15, 2022). 22 pages.

* cited by examiner

CONTINUOUS CALIBRATION OF SENSORS IN A REMOTELY MONITORED COOLING SYSTEM

PRIORITY

This application claims priority to and the benefit of U.S. Provisional Patent Application Ser. No. 62/902,849 filed in the U.S. Patent Office on Sep. 19, 2019 and of U.S. Provisional Patent Application Ser. No. 62/948,292 filed in the U.S. Patent Office on Dec. 15, 2019, the entire content of these applications being incorporated herein by reference as if fully set forth below in its entirety and for all applicable purposes.

TECHNICAL FIELD

The present invention relates generally to management and calibration of cooling systems, including HVAC, refrigeration and other environmental control systems.

BACKGROUND

Refrigeration cooling, cell-incubation and heating, ventilation, and air conditioning (HVAC) systems, collectively herein referred as temperature-controlled assets or assets, suffer a loss of operating efficiency over time due to manufacturing defects, mechanical degradation, poor power-quality, adverse environmental factors, deferred maintenance or simple misconfiguration. A loss of reliability or efficiency must be detectable, measurable and correctable, so as to avoid damage to equipment or spoilage to contents. Today however, the systems and methods for determining the state-of-health for a refrigeration cooling, heating and HVAC system follow reactive fail-and-fix procedures, whereby repairs are applied only after the equipment fails—essentially, the failure of the asset is the first evidence of a needed repair. This approach results in decreasing reliability over time for assets that have not yet failed, leading to the highest possible labor and repair costs for assets when they fail in terms of energy, repair and maintenance costs.

In Life Science and Pharmaceutical applications as just one example, high-reliability, uniformity and precision control of temperature is also required to protect and assure the quality of research, manufacturing, transportation logistics or the storage of products and commodities contained within a temperature-controlled asset, shipping container or in a climate-controlled room. Products and commodities must be stored at prescribed temperatures which are often governed by government regulation and subject to audit. Compliance requires that the stability and the uniformity of temperatures in the cabinet are verified which entails the gathering and analysis of temperature measurements from multiple points, before products and commodities are added to the asset and, periodically thereafter according to standard operating procedures—typically every six (6) or twelve (12) months. The term applied to the inspection protocols which demonstrate compliance is called validation.

The validation process is labor intensive and expensive, costing $2,000 to $5,000 per asset or room and can take several days. Before the validation process can begin, the contents of the temperature chamber must be removed and to assess temperature stability and uniformity, a number of sensors, sometimes a dozen or more are placed on or about the shelves or walls of the chamber or room to measure temperatures from top-to-bottom, side-to-side and front-to-back. After the validation protocol is completed, the sensors are removed, and the asset is deemed to be validated if test protocol is completed and no deviations or exceptions are noted. The sensors and test equipment are then moved to the next asset and the validation process is repeated. In a typical Life Science facility with 300 Ultra-Low Temperature Freezers, the cost of a validation project can exceed $600,000 per year. In addition to the costs to administer a validation, the process can also induce and operational issues due to scheduling delays, lack of skills or the availability of specialized equipment.

Present industry best practices which rely on scheduled maintenance or validations are inefficient because an entire population of refrigeration assets must be inspected even though only a percentage might require repair, maintenance or validation. Equipment malfunctions, mechanical degradation, deferred maintenance and environmental conditions can cause temperatures to fall outside allowable limits (referenced by FDA as "exceptions"). When they occur, multi-million-dollar product losses are possible and are not uncommon. Continuous real-time monitoring systems are expensive and uncommon in the industry today. To avoid the uncertainties of maintaining equipment in a validated state, some operators adopt costly mitigation strategies involving the replacement of refrigeration assets with a 10-year life after only five years of service, even though there may be nothing wrong with some refrigeration assets.

One example involves ultra-low temperature freezers (UL freezers or −80 C freezers)—an estimated 500,000 of which are deployed in Life Science and Pharmaceutical manufacturing applications. Each ULT consumes the equivalent energy of an entire house, can account for 25-30% of all electricity consumed within a Life Science facility, with 20-50% of the assets wasting an average of 20% of energy. More often than not, this waste is due to missing or inadequate diagnostics systems, and poor skills and repair techniques of the Service Provider. In addition to wasted energy, the unexpected failure of a ULT Freezer in a Life Science application can result in the catastrophic loss of high-value, mission critical research specimens or pharmaceuticals. Therefore, there is an ongoing need for improved asset management systems applicable to refrigeration assets.

In another example, the contents of a refrigeration system in a Life Science company possibly valued at several million dollars, may be deemed spoiled (according to FDA regulations), and worthless if any part of the refrigeration compartment fails to maintain temperatures above or below a specific limit or standard. In some cases, the contents may also be deemed spoiled and worthless if the temperatures throughout the chamber cannot be verified over time, through well document measurements using calibrated instrumentation and precision test protocols.

In another example, cell-culture or production utilizes heated incubators which maintain accurate temperatures, humidity and CO2 concentrations. A lack of stability, uniformity or concentration in the chamber affecting any of these parameters can result in low production yields or the complete loss of a growth cycle which sometimes takes months to compete.

Mission-critical cold-storage applications in the Life Science and Pharmaceutical companies are a small part of the overall industry for refrigeration which includes commercial refrigeration in food-processing for example, and HVAC. The refrigeration and air conditioning repair industry overall produces more than $2.5 billion in revenues annually, employs more than 38,000 repair technicians who continue to use "fail and fix" repair methods that have been substantially unchanged for 50 or more years. The refrigeration industry is also coming under increased regulation by the governmental agencies through programs such as the Energy Star™ program in the United States, which seek to drive adoption new energy conserving technologies into the laboratory equipment market.

SUMMARY

Certain aspects of the present disclosure provide improved asset management systems and methods which employ proactive predict and prevent methods for anomaly detection. The methods disclosed can be used for dynamic recalibration of temperature sensors utilized to monitor the stability and uniformity of temperatures in an asset or room with more frequency, at much reduced cost and with less labor. Certain aspects are applicable to refrigeration systems and assets including individual refrigeration assets, refrigeration farms comprising large numbers of refrigeration assets, and/or walk-in rooms which use one or more refrigeration systems, which may be collectively referred to as refrigeration systems or refrigeration assets.

In an aspect of the disclosure, a method of managing refrigeration systems includes receiving measurements captured by a plurality of sensors deployed with a refrigeration asset, the measurements being related to temperatures within a temperature-controlled chamber of the refrigeration asset, identifying a difference between a first temperature cycle obtained from measurements provided by a first sensor under test for accuracy, and a second temperature cycle obtained from measurements provided by at least one sensor, and calibrating the first sensor based on the difference between the first temperature cycle and the second temperature cycle.

In one aspect, the second temperature cycle is a baseline temperature cycle obtained from measurements previously received from the first sensor. In another aspect, the first sensor under test may reference a second temperature cycle of at least one sensor associated with another nominally operating asset such as an identical or comparable peer in a population, or against a peer model derived from an evaluation of one or more comparable peers in a group or population.

In certain aspects, the second temperature cycle is obtained from measurements provided by two or more other sensors. The method may include determining that the first sensor is out of calibration when the measurements provided by the two or more sensors are consistent with one another and inconsistent with the measurements provided by the first sensor.

In one aspect, identifying the difference between the first temperature cycle and the second temperature cycle includes performing a frequency domain analysis of the first temperature cycle and the second temperature cycle.

In one aspect, the method includes determining that the first sensor is out of calibration based on measurements of current consumed by the refrigeration asset.

In certain aspects, the method includes calibrating the plurality of sensors prior to initial operation, detecting calibration errors, recalibrating the sensors based on differences in measurements provided by pairs or groups of sensors in the plurality of sensors after initial calibration. The method may include recalibrating the differences in measurements provided by the pairs or groups of sensors after a change in conditions within the temperature-controlled chamber or room. Conditions within the temperature-controlled chamber or room may be changed when an object is added to the temperature-controlled chamber or room. Conditions within the temperature-controlled chamber or room may be changed when an object is removed from the temperature-controlled chamber or room. Conditions within the temperature-controlled chamber or room may be changed when an object is moved within the temperature-controlled chamber, or if racking systems or shelves are moved, realigned or changed.

DETAILED DESCRIPTION

Figure 1:
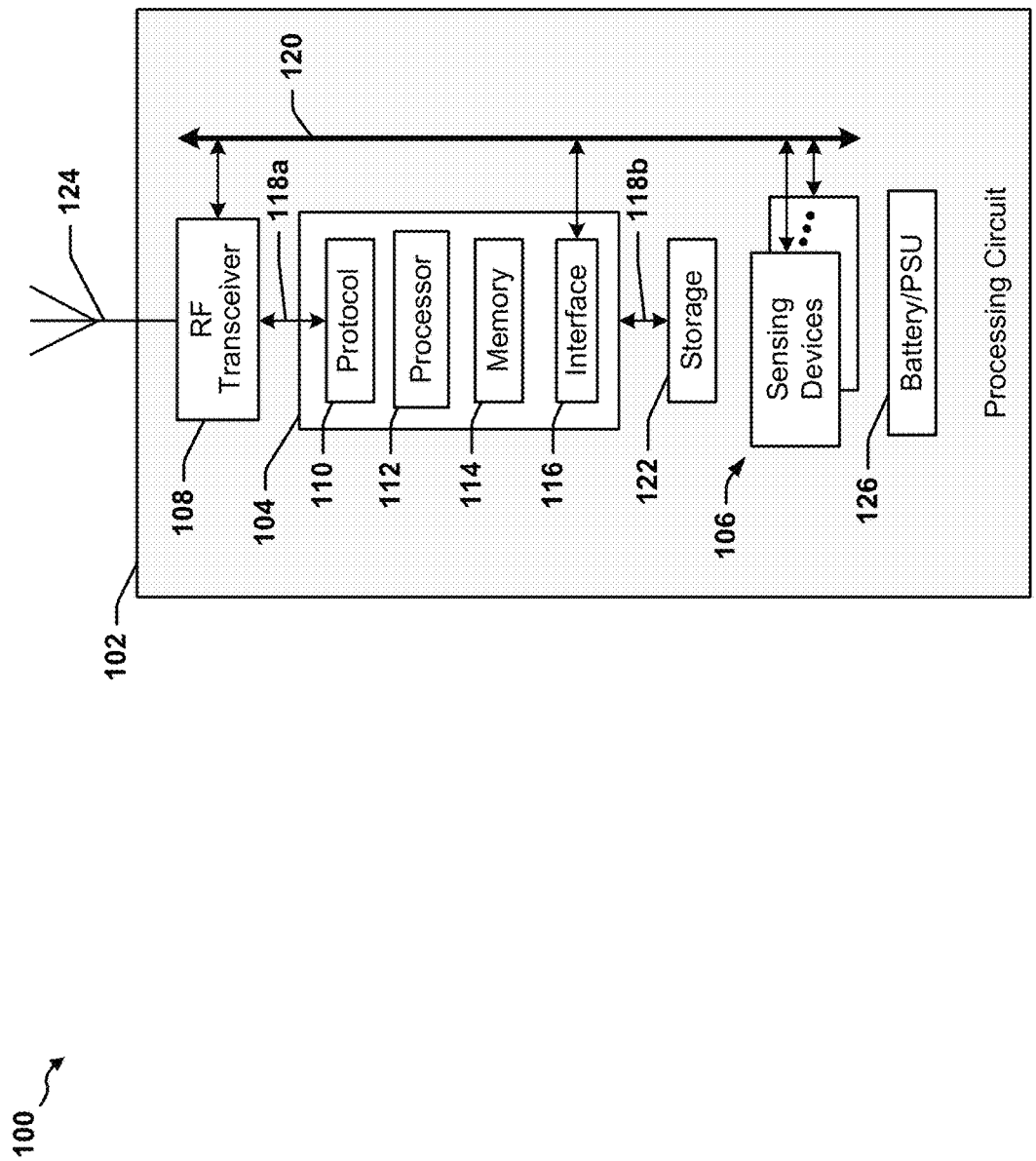
FIG. 1 illustrates one example of an apparatus that may be adapted according to certain aspects disclosed herein.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Overview

Certain aspects of the present disclosure provide an improved asset management system including new methods for anomaly detection to predict asset failures before they occur, new methods for continuous calibration of temperature sensors at lower cost and with less labor, and methods for initiating inspection requests or repair orders based on detecting the onset of equipment failure. Certain aspects are applicable to controlled-temperature refrigeration assets including individual refrigeration assets, refrigeration farms comprising large numbers of refrigeration assets and refrigerated walk-in rooms; other aspects are applicable to temperature-controlled heating assets such as cell-culture incubators, space-heating and cooling systems such as HVAC systems which provide room heating and cooling. Each or all may be collectively referred to as refrigeration assets or systems, heated or incubation assets, HVAC systems or collectively, temperature-controlled assets or assets.

In an aspect of the disclosure, one method includes determining by statistical inference, machine learning or artificial intelligence, that one or more sensors among the plurality of sensors distributed within the chamber of a temperature-controlled asset has experienced a calibration error or loss of accuracy due to drift, misplacement or complete failure, based on a determination that the sensor has lost correlation or covariance with its peers. For sensors which are deemed to be candidates for recalibration, the method of correcting (recalibration) in situ of each sensor, the amount of correction to be applied and resultant limits of confidence may be determined from previously known correlations and confidence intervals of the sensor to be recalibrated, in comparison to one or more sensors in the chamber or with reference to sensors in a peer asset or in a group of comparable assets in a population. In some instances, the group of comparable assets include a physical asset, a simulated asset or a digital twin of the asset for which calibration is performed.

In an aspect of the disclosure, a plurality of sensors is distributed within the chamber of a temperature-controlled asset, providing the means to immediately detect a change in the stability or distribution of thermal energy (refrigeration) associated with the onset of equipment failure. A change may indicate a restriction of refrigerant or oil in the capillaries or in a refrigeration circuit due to an accumulation of debris, or oil-logging the overcharging or undercharging of the refrigeration circuit, the use of an incorrect refrigerant formulation, a restriction of airflow around the asset or the presence of adjacent equipment or sources of heat which interfere with the cooling ability of the asset.

In another aspect of the disclosure, the method of detecting a seasonal (lead/lag) component in the correlations to improve the accuracy of detection models and to more closely analyze the reactions and responses of the refrigeration or heating system to stress events such as door openings, power failures or changes to environmental factors.

In another aspect of the disclosure, upon detecting the onset of equipment failure, the system may initiate or schedule an inspection or repair event, providing information about which section of the chamber is affected.

In another aspect of the disclosure, analytics are derived from an analysis of the stability, uniformity and time in or at temperature. The corresponding data may be used to calculate the Mean Kinetic Energy (MKT) of products stored in the chamber. In the event of a failure, the data may be used to determine which products may have been affected by a power or equipment failure, based on a priori knowledge of the type of and placement of product contained within the asset. Product losses can be reduced with this information.

In an aspect of the disclosure, a method of managing temperature-controlled assets includes receiving measurements captured by a plurality of sensors. The measurements may be related to temperatures within a temperature-controlled chamber of the asset. The method may include identifying a difference in value, trend, pattern or correlation between a first temperature obtained from measurements provided by a first sensor, and a second temperature obtained from measurements provided by at least one other sensor. An evaluation of the measurements may be time adjusted to account for detectable lead/lag relationships among and between the sensors.

In one aspect, the second temperature is a baseline temperature obtained from measurements previously received from the first sensor.

In certain aspects, the second temperature is obtained from measurements provided by at least one other sensors. The method may include determining that the first sensor is out of calibration when the measurements provided by the other sensor or sensors are determined to be consistent with each other but inconsistent with the historically correlated measurements with the first sensor.

In one aspect, the difference between the first temperature and the second temperature may be identified. In one example, the difference nay be identified by performing a frequency domain analysis of the first temperature cycle and the second temperature cycle.

In one aspect, the method includes determining that the first sensor is out of calibration based on measurements of current consumed by the refrigeration asset.

In certain aspects, the method includes calibrating the plurality of sensors prior to initial operation. Upon installing the sensors in or on an asset, the method may proceed by determining the relative or differences of values, trends, patterns or correlations among and between the sensors which provides an operational model for a correctly operating sensor located in or on a correctly operating asset. The failure or drift of one or more sensors may be detected as a change or uncorrelated difference of measurements from a sensor relative to at least one other sensor in the plurality of sensors. The method may include recalibration of at least one sensor based on known relationships and correlations of the sensor with at least one other sensor in the plurality of sensors. Conditions within the temperature-controlled chamber may be changed when an object is added or removed from the temperature-controlled chamber or following an access event which exposes the contents within the temperature-controlled chamber to the environment outside the chamber. Conditions within the temperature-controlled chamber may be changed when an object, rack, shelf, box, vial or sensor is moved or replaced within the temperature-controlled chamber, in response to a door-opening event which introduces a warmer or colder thermal mass. Upon detecting the occurrence of any such changes, the method may continue by deciding whether a redetermination of the relationships and correlations of the plurality of sensors is required based on the presence and persistence of the changes, and if so required, the relationships and correlations may be updated or redetermined.

In another aspect, the measured differences, correlations and temperature trends among sensors over time may be used to generate a benchmark or score describing the reliability or ability of the temperature-controlled asset to achieve or maintain a stable and uniform temperature within the asset chamber following the addition or deletion of products and commodities or following door opening events. The benchmark or score may also enable a comparison of an asset against its make/model peers in a population to determine its relative performance and whether repairs are necessary or (economically feasible) to restore performance to known achievable levels based on an analysis of its peers in a population of assets. Likewise, the benchmark or score can also enable comparisons between different makes or between different models from the same or different manufacturers for the purpose of making intelligent asset purchase, retirement and repair decisions. Changes in benchmarks or scores over time may indicate the onset of asset failure due to the failure of insulation, control systems, mechanical failure or issues with power quality or environmental conditions.

In another aspect, refinements to the benchmark or scoring concept can be derived from stress-EKG events, for example, when products are added or removed from the chamber when the supply of power or phase-change material is interrupted—a score then indicating the time or ability of the asset to recover and provide a stabilized and uniform temperature environment relative to its peers or other makes/models in a population.

In one aspect, a change in the correlation of a first sensor with at least one other sensor can be attributed to detection of the failure of the first sensor.

In another aspect, the sensors have multiple installation options and configurations depending on the design of the compartment or room at the time of manufacture or subsequently when installed as part of a field retrofit kit. The sensors can be installed within a compartment or room and/or attached to the walls of the compartment or room, encapsulated within, upon or about the shelves, racking systems, boxes or vials on shelves or retention systems within the chamber or room. Mats or partitions that contain or encapsulate the sensors may be provided or designed to promote ease of installation or protection of the sensors and cabling within the rack, shelf, chamber or room. The sensors may communicate with the monitoring system via wireless, wired, magnetic or acoustic means.

Various aspects of the disclosure relate to systems, apparatus and methods that may be used to monitor, manage, control and report on the operational reliability, temperature stability and uniformity of refrigeration systems that may be deployed locally or remotely and/or in large numbers. To facilitate description of certain aspects, specific details related to refrigeration and/or freezer assets will be given, and it will be understood that the aspects may be practiced without these specific details. The concepts, methods, apparatus, and computer program products described herein relate equally to HVAC systems, environmental control systems, cooling systems, refrigeration systems and associated refrigeration assets, including ULT refrigerators and freezers, refrigeration plants, cold-rooms and cold-storage facilities. The performance of these various systems may be monitored, classified and correlated according to certain aspects of the disclosure and using temperature measurements, electrical current flow measurements, vibration measurements and/or other measurements that can be obtained. The measurements may have known, inferred, deemed, and/or calculated correlation with refrigeration performance. Performance may quantify and/or characterize the status, health, reliability temperature stability, uniformity and/or energy usage of a refrigeration asset or refrigeration system. Refrigeration assets in need of repair may be identified and a repair process may be specified, classified, managed locally and/or remotely.

Certain aspects of the disclosure relate to the management, calibration, documentation and validation of performance over time of refrigeration cooling (refrigeration) and heating, HVAC systems, which may be referred to collectively or individually as "environmental systems," or systems, herein. Environmental systems may employ electrical, mechanical, electro-mechanical, Peltier, evaporative and phase-change materials such as liquid nitrogen and dry-ice as a refrigeration or heating sources. Environmental systems are often deployed in retail and commercial applications but for some applications, such as life science research, pharmaceutical manufacturing and other scientific and food-related applications. The systems and environmental chambers in particular, perform mission critical cold-storage functions which require stable and precise temperatures and accurate measurement instruments to assess and assure their performance.

It is necessary that a temperature-controlled system be able maintain a continuously stable temperature at multiple points inside the system chamber, and in some mission critical applications, to a specified level of accuracy using sensors which are calibrated using specialized calibration reference instruments. The use of the instruments requires manual labor to install and remove the many sensors which are required but most often not built into the system, in order to derive a temperature map of all useable areas and containment spaces inside the chamber or a system. Because sensors can lose accuracy or become damaged over time, temperature mapping or validation is performed at periodic intervals, such as at every six-months, one-year, two-years etc., which is labor intensive, often costing thousands of dollars per mapping operation for each freezer. In some manufacturing operations, particularly in the Life Science and Pharmaceutical manufacturing industry, the temperature mapping process is highly controlled and documented referencing standard operating procedures published by the manufacturer or by industry organizations or government bodies. Conventional regulations and specifications require labor for the testing and labor to prepare the validation documentation, the documentation is subject to audit by the standards body. At the end of the validation process, the system is deemed to pass or fail. If it fails, a repair is indicated, if system fails again after repair, the system cannot be put to use for any purpose which requires conformance to a validation specification, but it may be suitable for other less critical applications. Sometimes the system is replaced because it cannot be repaired to meet a standard or validated level of performance according to validation criteria or standard operating procedures.

Certain aspects of the present disclosure may be described in relation to a variety of types of refrigeration assets, including refrigeration farms comprising large numbers of refrigeration assets. Systems and methods are described that may be used to monitor and analyze performance of HVAC and/or refrigeration assets, and can identify and select refrigeration assets in need of repair. In some aspects, the performance of sensors and other equipment used to monitor and analyze performance of HVAC and/or refrigeration assets may also be ascertained through the analysis of measurements delivered by the monitoring equipment.

Certain aspects of the present disclosure provide improved management of refrigeration systems based on proactive predict-and-prevent methods for anomaly detection, and improved methods utilizing less labor for recalibration and revalidation of assets, and detection of temperature sensor calibration errors. Certain aspects are applicable to refrigeration and HVAC systems and assets including individual refrigeration assets, refrigeration farms or biorepositories comprising large numbers of refrigeration assets, and/or walk-in rooms which use one or more refrigeration systems, which may be collectively referred to as refrigeration systems or refrigeration assets.

Certain systems and methods are provided that can determine the status and/or state-of-health of HVAC, refrigeration, assets and monitoring equipment, where monitoring equipment may include wired and/or wireless sensors that transmit data to an application server for analysis and benchmarking of performance. Data may be processed and measured against time or in reference to predefined benchmarks and/or norms in order to determine relative performance in reference to selected peers as defined by query criteria, normalization, lead/lag adjustments to the time series or filters. The analysis and results may be represented with a visual indication, mathematical or pattern recognition function, such as a sine wave or a statistical model. The application server may be accessed through any application, web browser or web interface, and the user can have a distinct login identification and password which defines roles and privileges for access and utilization of the interface.

Systems, methods and apparatus may be applicable to managing the health and determining the validation status of refrigeration assets by measuring, mapping, and comparing the sensor temperature measurements with reference to a specification or industry standard, the distribution, uniformity and stability of temperatures in refrigeration assets, including, refrigeration plants, cold-storage facilities comprising large numbers of refrigeration assets, and temperature-controlled shipping containers. Refrigeration systems may be managed by receiving measurements captured by a plurality of sensors deployed within a refrigeration asset, the measurements being related to temperatures and temperature cycles within a chamber, identifying a difference between measurements of temperature obtained from a first sensor occurring during a temperature cycle and temperature measurements from at least one other sensor occurring during its temperature cycle and calibrating the first sensor based on the difference between the temperatures of the first and at least one other temperature sensor. The temperature measurements differences may be adjusted for a time delay, cycle variance or offset due to the differences of the location or thermal mass near or surrounding one or more sensors. A statistical or frequency domain analysis of a first temperature cycle and a second temperature cycle may be used to adjust for time-delay differences attributable to design of the refrigeration system, probe placement or due to the commodities or structures placed near, around or attached to the sensors.

FIG. 1 illustrates an example of an apparatus 100 that includes or manages sensing devices 106. The apparatus 100 may include a processing circuit 102 that has multiple subcomponents or devices 104, 106, 108, 122, 122, 126. In some instances, the processing circuit 102 may be implemented in an SoC. In some instances, the processing circuit 102 may be implemented in, or include an ASIC. In one example, the apparatus 100 may include an RF transceiver 108 that enables the apparatus 100 to communicate through one or more antennas 124 with a radio access network, a core access network, the Internet and/or another network.

In the example illustrated in FIG. 1, the processing circuit 102 includes an ASIC device 104 that has one or more processors 112, and other logic circuits. The processing circuit 102 may be controlled by an operating system and may provide an application programming interface (API) layer that enables the one or more processors 112 to execute software modules residing in a storage device 114, 122 for example. The software modules may include instructions and data. The ASIC device 104 may access its internal storage device 114, external storage 122, and/or other storage devices. The storage devices 114, 122 may include read-only memory (ROM) or random-access memory (RAM), electrically erasable programmable read-only memory (EEPROM), flash cards, or any memory device that can be used in processing systems and computing platforms. The processing circuit 120 may include, or have access to a local database or other parameter storage that can maintain operational parameters and other information used to configure and operate the apparatus 100 and/or the processing circuit 102. The local database may be implemented using registers, a database module, flash memory, magnetic media, EEPROM, optical media, tape, soft or hard disk, or the like.

The processing circuit 102 may communicate through one or more interface circuits such as the RF transceiver 108, which may include a combination of circuits, counters, timers, control logic and other configurable circuits or modules. In one example, the RF transceiver 108 may be configured to operate in accordance with standards-defined communication specifications or protocols. The processing circuit 102 may include or control a battery or power management device 126.

Figure 2:
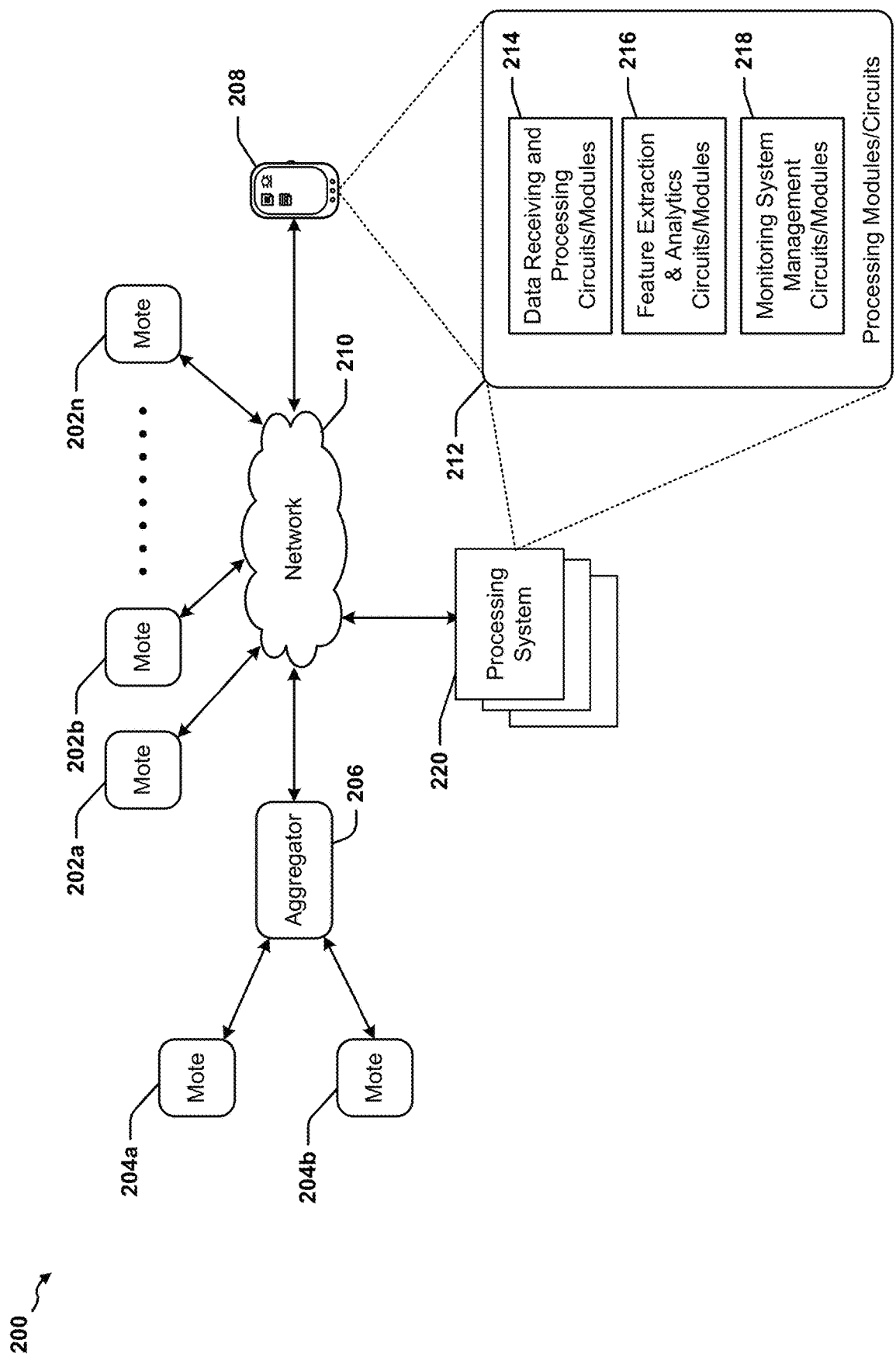
FIG. 2 illustrates a system configured to monitor a plurality of assets equipped with sensors in accordance with certain aspects disclosed herein.

FIG. 2 illustrates a network of devices 200 that may be deployed to monitor various types of refrigeration system, HVAC system or other environmental control systems. A plurality of networked devices 202a-202n, 204a, 204b, each of which may be referred to as a "Mote," may be adapted or configured to sample data produced by one or more sensors, and to transmit the sensor data to a mobile computing device 208 or processing devices 220. In one example, one or more of the networked devices 202a-202n, 204a, 204b may be implemented using an apparatus 100 as illustrated in FIG. 1. In one example, each processing device 220 may perform certain functions as part of a systems that includes the network of devices 200. Each processing device 220 may be accessible through a network 210 which may include the Internet. In another example, the mobile computing device 208 may be configured to enable field service personnel to interact with equipment targeted for service calls and with other portions of a system that includes the network of devices 200. The mobile computing device 208 may include one or more wired or wireless transceivers and/or line drivers and receivers that enable the mobile computing device 208 to communicate with certain of the networked devices 202a-202n, 204a, 204b, and/or other processing devices 220 coupled to the network 210. In some instances, the mobile computing device 208 includes or may be coupled to one or more external sensors that can be used to monitor an asset during field servicing. In some instances, the mobile computing device 208 may interface with a computing system or other intelligent device provided within a managed asset.

The mobile computing device 208 or processing devices 220 may include respective processing circuits 212 adapted or configured to communicate with and/or control with the networked devices 202a-202n, 204a, 204b. In one example, a processing circuit 212 includes circuits and/or modules 214 configured to receive and process sensor data sampled by the by the networked devices 202a-202n, 204a, 204b, circuits and/or modules 216 configured to process the sensor data to derive sensor metrics used for determining health of assets and changes or differences in health of an asset with respect to peer assets and/or relative to prior states of the asset, and circuits and/or modules 218 configured to manage or monitor operational characteristics of sensing devices 106.

In the illustrated example, some the networked devices 202a-202n may communicate through a network 210 using wired or wireless communications technology, while other networked devices 204a, 204b may be coupled to an aggregator 206 that collects, processes and/or forwards sensor data from the networked devices 204a, 204b. Each of the networked devices 202a-202n, 204a, 204b may sample data from one or more sensors.

Certain aspects of this disclosure relate to systems used to store, maintain and manage materials at ultra-low temperatures. In one aspect, cooling systems used to store specimens, pharmaceuticals and other life science products, byproducts and source materials can be monitored in real-time using sensors and instruments that are maintained in calibration by continuously monitoring and validation of the sensors. Validation may describe or relate to a process or test procedures for assessing the stability and uniformity of temperatures in the chamber of a refrigeration asset. In one example, testing protocols may be provided by third parties such as the National Institute of Standards and Technology (NIST), a test authority such as Underwriters Laboratories (UL), or an industry association such as College of American Pathologists (CAP) or World Health Organization (WHO). In some examples, the cooling system may include a biorepository that employs one or more ULT refrigeration systems to store specimens used in Life Science applications.

In many instances, a biorepository is certified and/or accredited by an organization such as the College of American Pathologists in the United States of America. To be certified or accredited, the biorepository may be required to comply with certain standards governing and procedures detailing storage conditions for specimens of different types, and for calibration of storage equipment and sensors used to monitor storage equipment. For example, the standards may relate to the operating range of ULT refrigeration systems, defining limits, tolerances and/or temperature set points that define operating temperature range in storage compartments of the ULT refrigeration systems.

An operator may be required to record or log temperatures observed within the storage compartments of the ULT refrigeration systems. In one example, the operator may be required to log the average temperature, maximum, and/or minimum temperature within a 24-hour period may be logged. A certification entity may define standards for calibration of sensors. The calibration standards may define a periodicity for calibration or recalibration of sensors that measure temperatures in the storage compartments of the ULT refrigeration systems. In some instances, sensors must be initially calibrated using a standards-certified thermometric device. In some instances, there may be a recalibration that temperature sensors be periodically recalibrated according to a defined schedule or within a defined period.

Certain aspects disclosed herein enable a cooling system to be remotely monitored such that temperature measurements within cooled storage compartments can captured continuously and logged at any desired or required frequency. Certain aspects of the disclosure enable continuous calibration of sensors in remotely monitored cooling system without the use of external equipment. In some instances, a remote monitoring system receives temperature information from sensors in the cooling system, where the temperature information is processed to capture temperature variations and trends. In one example, temperature variations can be captured with a 1-minute resolution. The automated system operates continuously and can provide alarms, alerts and other notifications on a 24-hour basis. The alarms, alerts and other notifications permit rapid response to fast-onset critical issues, and may permit preemptive action to avoid occurrence of such issues.

Figure 3:
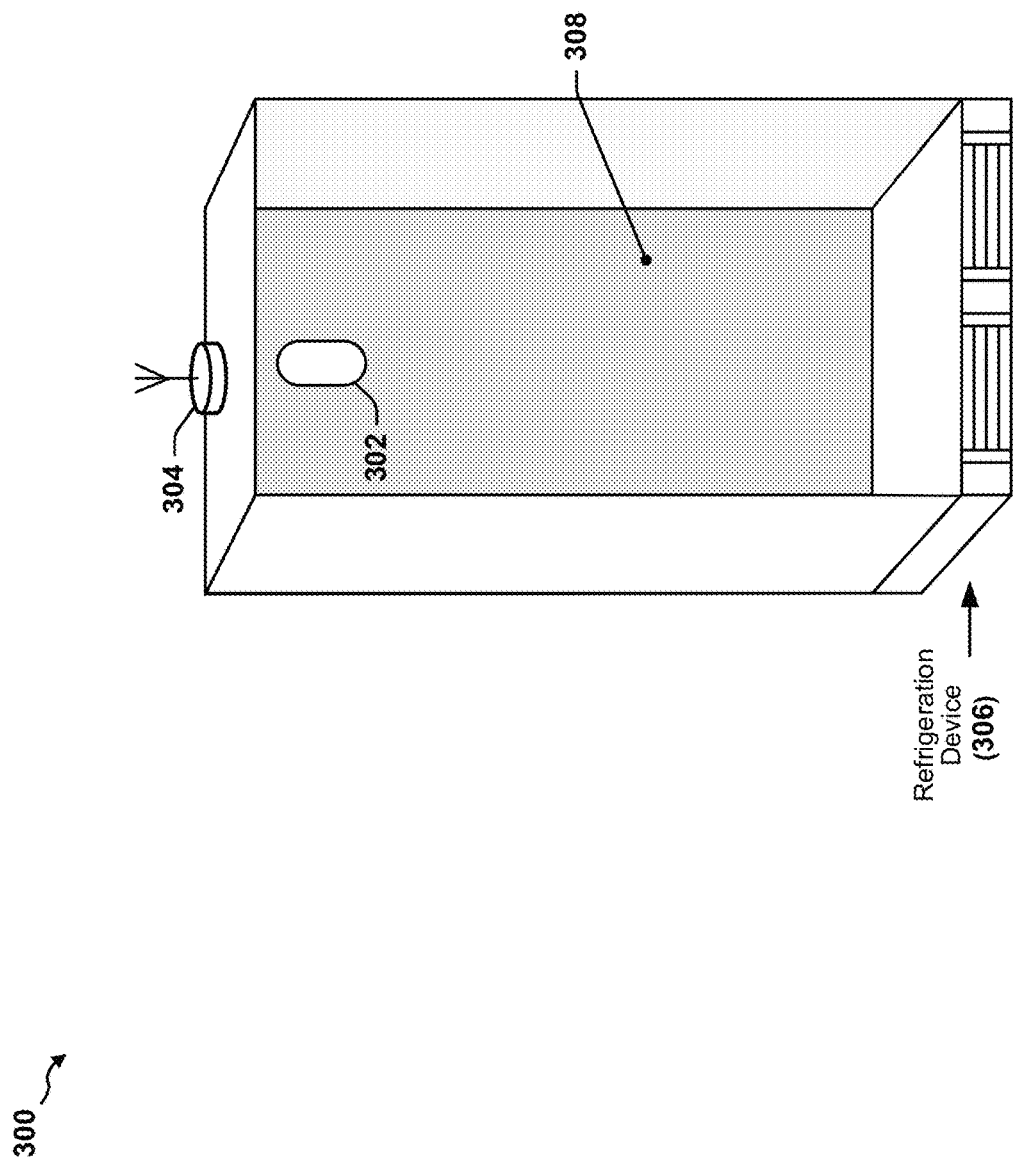
FIG. 3 illustrates a first example of a refrigeration unit subject to monitoring in accordance with certain aspects of this disclosure.

FIG. 3 illustrates an example of a freezer 300 in a cooling system that has been implemented in accordance with certain aspects disclosed herein. The freezer 300 may be instrumented using sensors that can be remotely monitored. The freezer 300 has an internal compartment 308 that is maintained at a desired temperature by a refrigeration device 306. For example, the refrigeration device 306 may operate using a thermodynamic refrigeration cycle such as the Carnot cycle and may comprise one or more compressors, condensers, evaporators and a charge of a refrigerant, such as Freon. It will be appreciated that a thermodynamic refrigeration cycle can be implemented using a refrigerator and/or using a heat pump. Certain aspects of the present invention may be applied to heating and cooling systems. Certain aspects disclosed herein may be described or illustrated using the example of a freezer 300 or refrigeration device 306 which accomplishes deep cooling of a compartment 308 used to store items and materials which may include, for example, biological samples. It will be appreciated that the invention may be used in commercial food storage systems, consumer equipment and any other refrigeration system or system that uses a heat pump. In one example, an optimal and/or desired practical operating temperature for a ULT freezer is approximately −80° Celsius. The selection of operating temperature is typically made based on application requirements and operational limits of the refrigerant or other component of a system or freezer 300. In the example of a ULT Freezer using a Freon refrigerant, the Freon-based thermodynamic refrigeration cycle typically has a lower operating temperature limit of −86° Celsius.

It will be appreciated that the refrigeration device 306 may include multiple component parts, some of which may be installed within and/or adjacent to compartment 308. Certain embodiments employ thermal sensors 302 that are in thermal communication with the storage compartment 308 to measure temperature within a compartment 308 of freezer 300. In some instances, electrical sensors may measure power consumption, voltages and/or currents in the refrigeration device 306. In some instances, vibration sensors may be mechanically coupled to mechanical and/or electromechanical components in the refrigeration device 306. In some instances, environmental sensors may provide information related to the environment in which the freezer 300 is located.

Sensors can be electrically or electromagnetically coupled to a controller 304 (e.g., a Mote), which may be located outside the compartment 308 or cooled interior of a refrigeration system or freezer 300. Location may be selected to ensure an ambient temperature for electronics components that is within operational tolerances of electronics devices. Certain aspects disclosed herein may employ sensors installed in HVAC systems, refrigerators and freezers during manufacture or assembly.

Location of the controller 304 may be selected to facilitate access to power, for optimal wireless communication and/or for easy access during setup and maintenance. The controller 304 may include one or more processors, storage and means of communications as will be addressed in more detail below. Placement of the controller 304 on the outside of the freezer serves to ensure any contents inside the compartment 308 will not damage the sensor 302 or inhibit transmission of the readings. In some embodiments, the controller 304 may comprise a wireless transmitter. In some instances, sensors and/or controllers 304 may employ hard-wired or other communication means instead of, or in addition to, a wireless transmitter. A controller 304 can be powered by internal battery and/or from an external power source or supply.

In certain implementations, the controller 304 may transmit accumulated vibration, temperature, current, voltage and/or power measurements over a predefined time interval. It is contemplated that some controllers 304 may be configured to relay measurements without processing and/or may relay temperature measurements when contacted by another controller (not shown), gateway and/or accumulation device, regardless of the amount of data accumulated by the controller 304.

Figure 4:
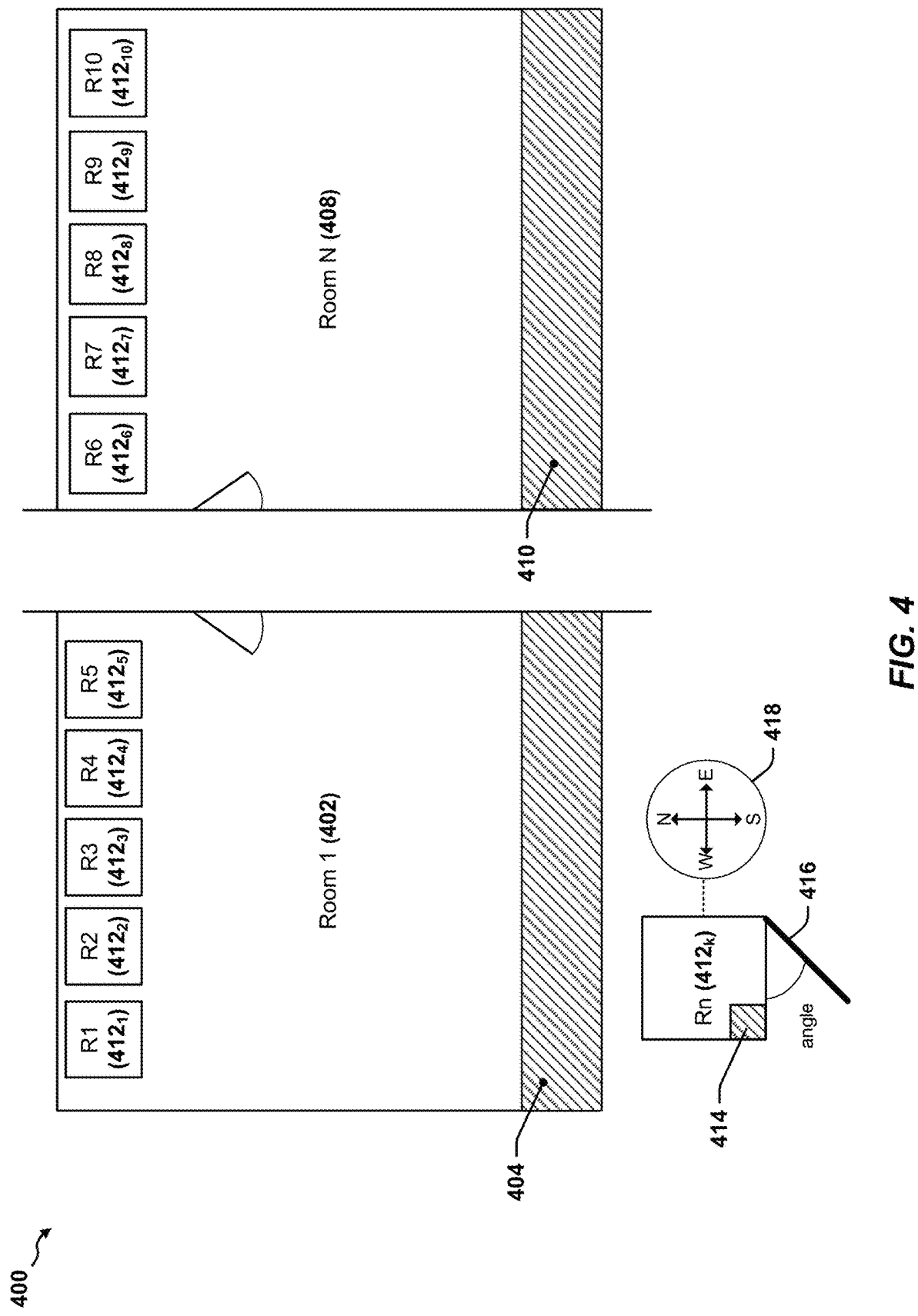
FIG. 4 illustrates an installation that includes multiple freezers.

Turning to FIG. 4, an installation 400 may include multiple freezers $412_1$-$412_{10}$ in various rooms or structures 402, 408, which may also include environmental control plant 404, 410. The environmental control plant 404, 410 may be an HVAC system or a refrigeration system. In some implementations, individual freezers $412_1$-$412_{10}$ can monitor and track the location of objects within the rooms or structures 402, 408. Each freezer $412_1$-$412_{10}$ can be assigned a distinct icon, relevant identifying information, and strategically incorporated in a virtual layer of a representation of the installation 400. In the representation, a distinct icon associated with each freezer $412_1$-$412_{10}$ can indicate an alarm status by its changed color or an action, such as a spinning or revolving motion. For example, a freezer $412_1$-$412_{10}$ with an alarm status may be represented by a red icon and/or a spinning icon. In certain implementations, animation of an icon may correlate to a specific event or type of alarm. For example, a rapidly spinning icon can represent a freezer $412_1$-$412_{10}$ with an observed increase in energy consumption. A red icon may represent a freezer $412_1$-$412_{10}$ that has been improperly (re)located within the installation 400. A blinking icon can represent a freezer while it is being moved. Icons may be assigned to the environmental control plant 404, 410.

For each freezer $412_1$-$412_{10}$ in the example, a sensor 414 such as a magnetometer, global positioning satellite (GPS) device 418, or other type of device may be placed near the freezer door 416. The sensor 414 may indicate position of a freezer $412_1$-$412_{10}$ and/or relative position of the freezer door 416. A current transducer, voltage sensor or vibration sensor may also be monitored. The information from the various sensors can be used to determine operational characteristics, location and orientation of the freezer relative to a wall or structure and monitor when a freezer is moved from one location to another. Readings from the magnetometer can also indicate when the door is open and can account for irregularities in temperature data. Energy is added to a conditioned area when the door is opened and creates changes that are not indicative of compressor performance. In addition to a temperature sensor, integrated transceiver, and current transducer, a comprehensive monitoring unit may also include additional attached digital input devices, such as an attached humidity sensor.

Figure 5:
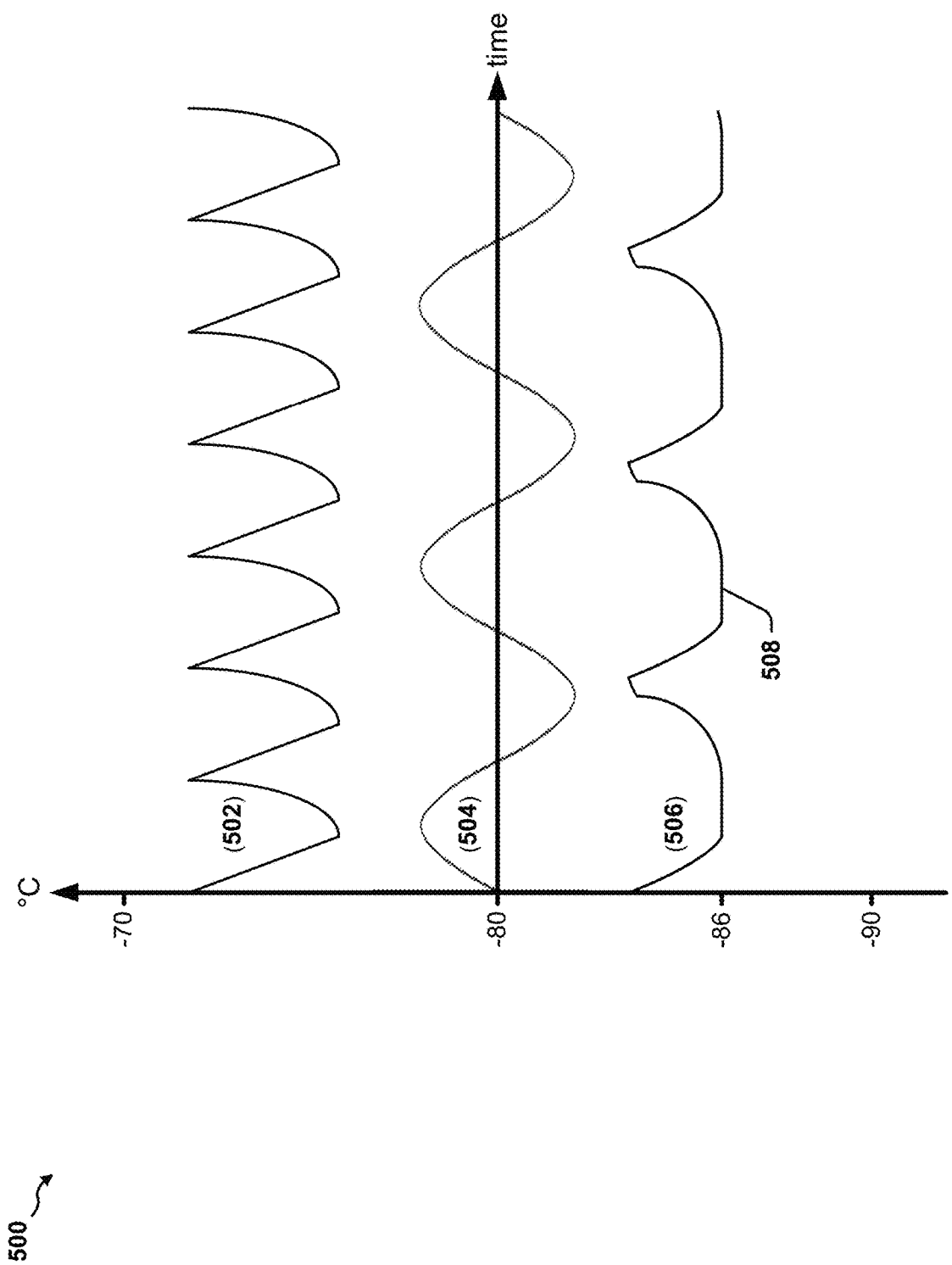
FIG. 5 temperature profiles for refrigeration units.

FIG. 5 illustrates examples 500 of profiles generated from temperature measurements for one type of refrigeration unit. These profiles are typically generated from temperature data captured over a period of time, and analysis of the temperature data can be used to determine freezer performance over the time period. Baseline profiles can be obtained as an aggregate of profiles of a plurality of similar freezers and/or from a freezer that is functioning within rated specifications. In particular, temperature cycles within the compartment can be characterized using statistical and pattern analysis techniques to derive a steady-state characteristic of temperature within the compartment.

A baseline for a population of freezers of various manufacture and models can be established by comparing the plotted curves of each unit to one another in order to establish a normalized average pattern. A baseline can also be established using previously captured data obtained from a similar model freezer or group of freezers known to be running at nominal and/or optimal performance levels. Baseline data can be provided by a user and/or by download from a networked repository of baselines. Baseline data can be used for comparison with a temperature profile captured from an individual unit and the comparison may then yield information correlated to the health of the individual unit. Many approaches in establishing a baseline are conceivable, and some of these approaches may be user-defined. In certain embodiments, any appropriate comparison metric may be used. In one example, the comparison metric may comprise a statistical moving average.

In FIG. 5, an idealized and simplified baseline profile 504 of a freezer operating at optimal conditions is generally sinusoidal. The sine curve oscillates about −80° Celsius and has a consistent amplitude with minimum and maximum values of −84° Celsius and −76° Celsius, respectively. In this example, the refrigeration cycle may be considered to be active while the internal freezer temperature is greater than −80° Celsius and is disabled when the temperature is at, or below the nominal operating temperature of −80° Celsius. Because of thermal inertia within the freezer, temperature continues to change after the refrigeration cycle transitions between on and off. It will be appreciated that the volume and mobility of air within the freezer typically dictates the frequency of oscillation of temperature. Accordingly, the sample rate of temperature may be adjusted based on frequency of oscillation. Typically, at least two temperature readings per time period is required to capture frequency of oscillation, although more samples are generally required to identify the form of the curve, harmonic frequency content and step functions attributable to events, malfunction, etc.

Variations of maximum, minimum and median temperatures from nominal values, and/or shape of sections of the temperature characteristic can be used to assess the efficiency of the thermodynamic refrigeration cycle and to indicate potential operational deficiencies of the refrigeration equipment. Temperature measurements can be analyzed and compare the freezer's performance to a baseline or stages during operation. Analysis of continuous temperature readings taken from individual freezers or groups of freezers can provide data or a pattern of temperature profiles that can be used to optimize power usage, schedule maintenance visits and generate alarms.

Signal analysis can be performed on a temperature profile using, for example, a statistical model. For example, a profile may indicate a peak representing a maximum temperature that terminates a rise from minimum to maximum values. The peak may be calculated as a statistical maximum. The profile may also indicate a minimum temperature terminating a fall in temperature as compartmental temperature is regulated. The minimum temperature may be calculated as a statistical minimum. In one example, the statistical maximum and minimum values may be calculated using a moving average. A statistical model can distinguish a true maximum and/or minimum temperature from other peaks and troughs in temperature identified within the profile. It will be appreciated that a variety of data filtering and analysis tools are known that can be applied to extract statistically significant characteristics of the profile. Such statistically significant characteristics can be used to manage freezer health.

The characteristics of a unit's temperature profile can be used to diagnose potential problems with refrigeration and other devices and can also be used to identify failing components. Advantageously, data can be obtained using wireless sensors from one or more refrigeration devices and the data can be characterized and categorized according to known correlations. As discussed above, the example of FIG. 5 provides a baseline profile 504 representing a freezer operating at optimal conditions. FIG. 5 also shows a profile 506 that is a simplified example of compressor saturation when temperature within the freezer reaches the operational limit 508 of Freon at −86° Celsius. It will be appreciated that profile 506 most likely represents a system in which the thermostat is set just above −86° Celsius and that the compressor continues to operate without effect until temperature within the freezer stabilizes at −86° Celsius or the temperature surrounding the thermostat reaches the set desired temperature. The system represented by profile 506 is operating inefficiently because the compressor operates without producing useful work.

A profile 502 with a higher frequency, more rapid refrigeration cycles, in comparison to the baseline profile 504, might be attributed to an incorrectly calibrated freezer relative to its storage capacity. Observed temperatures that fall outside a range of internally calibrated temperature ranges may indicate one or more problems including, for example, a Freon leak through a valve or through a deteriorating seal, lack of Freon circulation due to a clogged capillary tube, an inefficient or damaged condenser fan, a clogged filter, obstructed condenser coils, worn compressor valves, and/or other mechanical failure. A greater amplitude of oscillation during a compressor cycle may indicate a transfer of energy between the freezer and the surroundings in the form of heat resulting in increased power usage. A rise in temperature results in more current being drawn through the unit. An irregular spike in temperature can indicate damaged insulation within the compressor coil. As discussed herein, deviations from a normal or ideal temperature characteristic can be correlated with dysfunctions of the cooling system, inadequate air circulation within the compartment of a refrigerator or freezer. Correlations of dysfunction with observed temperature cycles are enabled in certain embodiments of the invention by observing, recording and analyzing temperature variations in a plurality of refrigeration devices over prolonged periods of time.

Figure 6:
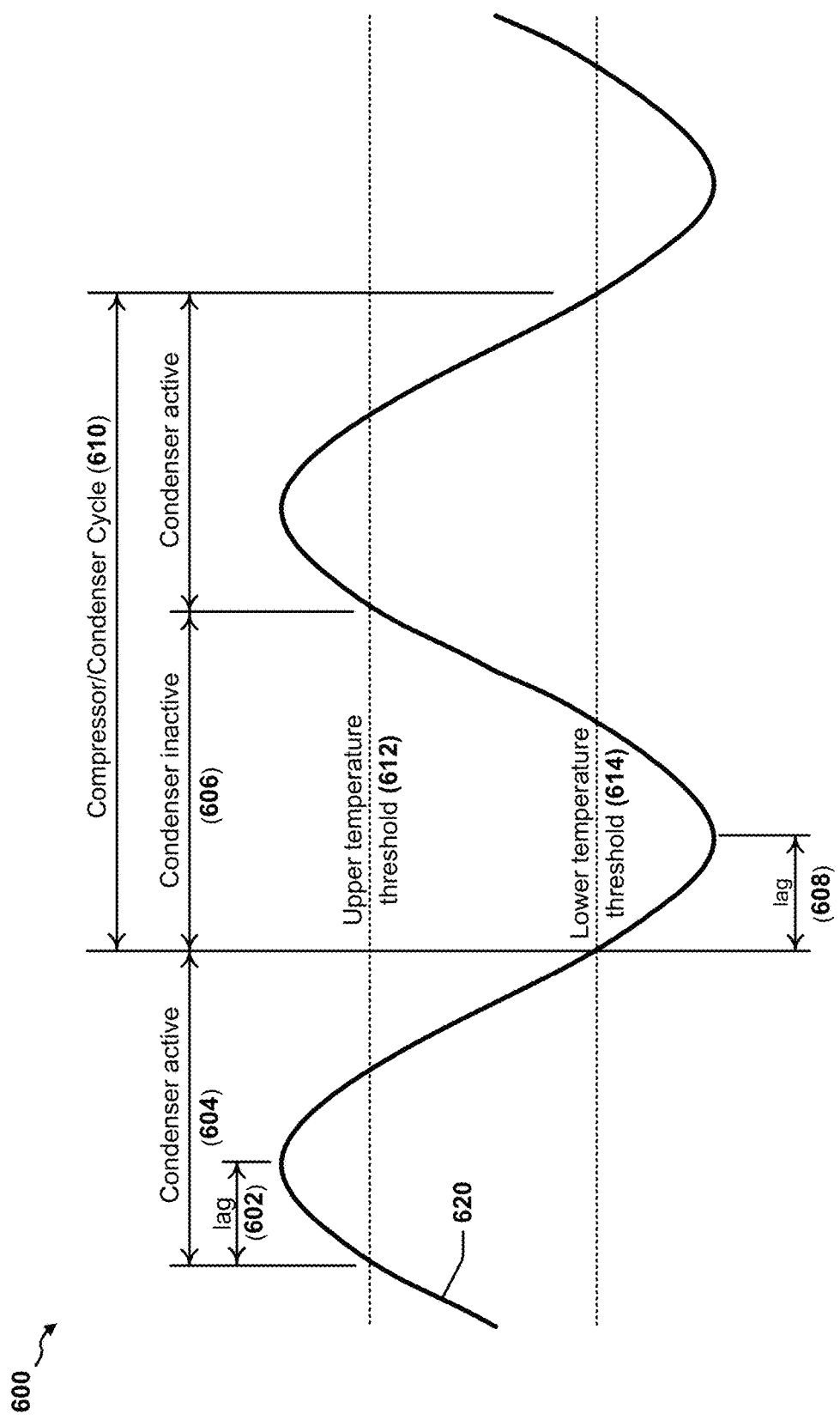
FIG. 6 illustrates the condenser cycle within a temperature profile.

FIG. 6 illustrates an example of a temperature characteristic 600 of a freezer compartment monitored according to certain aspects of the invention. The characteristic 600 identifies certain inferences that can be drawn regarding condenser or compressor cycles 610. As depicted, the characteristic 600 is substantially sinusoidal having a phase shifted half-cycle 604 that corresponds to a period when the condenser of the freezer is active, followed by a half-cycle 606 when the condenser is inactive. Condensers function to cool the refrigerant, such as Freon, and convert the vapor into a liquid while at a constant temperature and pressure.

The phase shift between temperature characteristic 600 and the condenser half-cycles 604 and 606 can arises because of lags 602 and 608 in measured temperature response to compressor transitions between active and inactive, air flow within compartment 308 and for other reasons. In typical applications, condenser half-cycles 604 and 606 may be affected by other stages and characteristics of a refrigeration cycle, such as flash point evaporation and movement of the refrigerant through the evaporator. Transition between condenser half-cycles 604 and 606 may be correlated with a point in time before the highest temperature observed and corresponding to the crossing of an upper temperature threshold 612. Transition between condenser half-cycle 604 and next compressor active half-cycle 606 may be correlated with a point in time before the lowest temperature observed and corresponding to the crossing of a lower temperature threshold 614.

In certain embodiments, compressor activity can be inferred from the temperature characteristic 600. In the example illustrated in FIG. 6, the temperature characteristic 600 is symmetric and phase shifts or lags 602 and 608 can be assumed to have an equal length of time and can be effectively ignored. Therefore, it can be inferred that the condenser is turned on for 50% of the time. In other instances, the ratio of active and inactive condenser periods may be non-unitary and the resulting temperature characteristic is likely to non-sinusoidal but is likely to be periodic. Accordingly, signal analysis techniques may be employed in some embodiments to extract a fundamental frequency of the refrigeration cycle and to identify other cycles that can be attributed to condenser activity and inactivity. In some embodiments, analysis of the temperature characteristic may identify acceleration/deceleration of rate of change of temperature within a half cycle of the temperature characteristic; these changes in acceleration and/or deceleration, and general trends in the temperature characteristic before such changes can be used to identify compressor on/off transitions. Changes and trends may also be determined from current, voltage, power consumption and vibration measurements.

Other functions of a refrigerator may be identified from sensor measurements. For example, changes in the characteristic and/or the presence of certain harmonic frequencies may indicate when a pump is engaged, when refrigerant vapor is compressed and/or superheated. Long term changes in an observed temperature characteristic can be predictive of refrigeration system failure or loss of energy efficiency. For example, progressive deterioration of mechanical parts can lead to changes in the temperature characteristic (e.g. increased cycle frequency) that are detectable, given sufficient lapsed time. The rate of change and the manner of change can indicate impending loss of efficiency or failure based on similar changes previously observed other refrigeration devices.

It is also contemplated that the relationship between multiple connected compressors within a freezer can be identified by analysis of a temperature characteristic. In one example, the high-pressure output stage of a first compressor can be coupled to the low-pressure input stage of a second compressor. In another example, refrigeration systems may operate in parallel. Other refrigeration component combinations are contemplated. The relationship between the coupled compressors can be identified in a single characteristic obtained from sensors, while the state of health of each individual compressor in the combination may be inferred. As discussed herein, the cooling devices of some commercial refrigerators and freezers are instrumented such that direct readings obtained from compressors, evaporators and Freon lines may be used to augment temperature readings obtained from within the compartment 308. Such direct readings can be useful in isolating specific components in predictive failure analyses. Certain embodiments develop information regarding relationships between direct readings and measured compartment temperatures; such relationships may be used to identify problems with heat transfer elements and airflow with a compartment 308.

The attribution of potential problems to specific refrigeration units and/or component can be achieved in certain embodiments of the invention. In particular, the use of indirect temperature and/or electrical current measurements can determine the financial cost and benefit associated with each refrigeration unit. Measurement of electrical current can supplement cost/benefit analysis. For example, condenser activity may be accurately characterized for a plurality of freezers and such characterization may be used to estimate power usage, based on rated current usage of the condensers. However, a malfunctioning or laboring condenser may consume considerably more power than a nominally operating condenser. Therefore, in certain embodiments, the monitoring of a population of refrigeration/freezer devices can include measurement or estimation of electrical current usage and the effects of dysfunctional refrigeration components on power consumption. Information developed from such monitoring can be used to correlate electrical current readings to power consumption of condensers. For example, information from monitoring can be used to determine the amount of electrical current drawn by a condenser and the temperature characteristic for the refrigerator can be used to determine the amount of time that the condenser is active.

Electrical current drawn by the condensers can be characterized for each individual freezer, for makes and models of freezer and can electrical current can be measured on a continuous or periodic basis. In certain embodiments, current measurements can be obtained for a freezer or refrigerator that is operating at designed efficiencies. These measurements can be correlated with temperature measurements for the refrigerator and freezer and can serve as a baseline for monitoring energy efficiency and for predicting failure.

Electrical current usage may be used to calculate power consumption by the refrigeration unit. The active power P required by a refrigeration unit operated at V volts and drawing I amps, is calculated as P=IV. Power used is then calculated as $PT_{ON}$ Watt Hours (typically stated as kilowatt hours), where $T_{ON}$ is the fraction of each temperature cycle when the compressor is active and drawing current. It will be appreciated that actual power usage may be obtained by scaling active power P with known power factors of the compressor or compressor type. Thus, calculation of power consumption by a refrigeration unit requires knowledge of current used by the refrigeration unit.

In certain embodiments, current load for an individual refrigeration unit may be determined or inferred, given that the power cycling properties of the refrigeration unit are predictable and/or determinable. In certain embodiments, electrical current measurements can be obtained for each refrigeration unit. In certain embodiments, current is measured at a power distribution panel, or on a power line that supplies current to multiple refrigeration units. Baseline measurements of electrical current drawn through a circuit supplying two or more refrigeration units or freezers can be used to determine the load of each refrigeration unit. Given sufficient time and data points, a periodic measurement of current in a circuit that feeds plural refrigeration units can provide sufficient information to discern the contributions of current use by each of the refrigeration units. Typically, variations in current measured at the power source can be correlated with temperature characteristics measured simultaneously at each of the freezers, thereby attributing current usage by the refrigeration unit.

Temperature and current correlations may be determined using a variety of techniques. In a simple example, when a temperature characteristic shows that a selected refrigeration unit is in a warming phase, it can be assumed that the selected refrigeration unit is drawing no current. When the selected refrigeration unit begins a cooling phase, any increase in measured electrical current may attributed to the selected refrigeration unit, if no other refrigeration unit has transitioned from "on to off" or from "off to on." Given sufficient data points, the individual contribution of each refrigeration unit can be calculated based on identified combinations of "on and off" refrigeration units. It is frequently more convenient to perform a frequency domain analysis of measured electrical current flow to find correlations with temperature cycles of refrigeration units that receive the electrical current. In a simple example, if four freezers are provided electrical current from the same power outlet, and the compressors of the refrigeration units operate at different frequencies, it would be sufficient to use a notch filter tuned to the frequency of a selected refrigeration unit to measure the amplitude of current attributable to the selected refrigeration unit. However, current and temperature data are typically analyzed using well-known signal analysis techniques.

Attribution of current consumption by individual refrigeration units may include the use of various algorithms that identify variations in current usage over a refrigeration cycle and can provide an average electrical current flow and percentage "on" time for each compressor. Having determined electrical current usage and "on-time" for each refrigeration unit, a user can determine power usage for each refrigeration unit over time, in comparison to other systems, and in comparison, to benchmarks and/or nominal operating specifications. Thus, a single electrical current measurement device can provide insight into the efficiency of multiple systems. Indirect estimation of electrical current load drawn through an individual unit can also allow for a measurement of efficiency based on energy consumption when compared with a healthy unit.

In certain implementations, methods for calculating power usage include measuring electrical current in a power line that supplies a plurality of refrigeration units. Electrical current measurements are typically sampled at a sufficient rate to enable correlation of variations in electrical current flow with the characteristics of the individual refrigeration units. A processor or controller can be configured to identify when each compressor is active, typically by analyzing the temperature characteristic for the refrigeration unit. At various sample points in time, a list of active compressors can be associated with a current measurement in the common power supply. With sufficient samples, the contribution of electrical current by each compressor can be calculated. This contribution represents electrical current consumed by the compressor and can be used to calculate the power consumption of the refrigeration unit based on the ratio of compressor active/inactive period. Accordingly, the efficiency of each refrigeration unit can be dynamically monitored.

In certain embodiments, a temperature sensor can recognize events relating to changes in temperature and respond by increasing sample rate. An application server may be configured to treat such increased sample rate as an alert for the corresponding refrigeration unit. It is contemplated that an alert may be triggered by any of a plurality of events, including detection of compartment temperature rising above one or more thresholds, temperature remaining above a maximum threshold for a predetermined amount of time, changes in rate of change of temperature and step changes in temperature. Similarly, alerts may be generated based on abnormal or sudden increase in current consumption. An alert related to temperature rising above a threshold can often be attributed to the door being opened. If the temperature readings remain at or exceed the maximum temperature, a door of the refrigeration unit may have been left open, and/or complete compressor failure may have occurred. Events may also include temperature range shifts from statistical norms for the refrigeration unit, often attributable to a failing or laboring compressor, incorrect calibration and/or changes in environmental conditions. For example, a compartment of a refrigeration unit may be overloaded given its storage capacity, and therefore unable to maintain a steady temperature. Alerts are typically sent to a user by Email, text message automated call, notification on a Web page and/or by any other suitable means.

Environmental changes may affect temperature readings and can include the specific placement of a refrigeration unit within a room adjacent to an unaccounted for heat sink. Refrigeration units located near or by a window may display increases in temperature that correlate to a temperature increase due to time of day and/or seasonal weather. The temperature of the room or structure in which the refrigeration unit is housed may increase due to improperly functioning or set environmental controls. An increase in temperature readings can also correlate to an increase in current or power usage, as the compressor does more work to maintain compartment temperature. In certain embodiments, a collective efficiency metric can be calculated as power usage per area occupied by refrigeration units. One such metric can be calculated as kWh/sq. ft. and the metric may be used to assess relative efficiency between different makes and models of refrigeration units. The metric may also be used to set thresholds for performance such that a decrease in performance may trigger an alert, generate a service request, etc.

In certain embodiments, portions of data collected by temperature and/or electrical current sensors may be eliminated from consideration when characterizing operation of refrigeration units, when identifying energy inefficiencies and for the purposes of predicting failure. It has been observed that most events, discontinuities and distortions in observed temperature characteristics can be attributed to human activity. Human activity that affects the temperature characteristic includes opening of the freezer or refrigerator, moving of the freezer or refrigerator, vibrations caused by human activity affecting airflow, variations in power supply due to use of electrical equipment and so on. Accordingly, analysis of data may be restricted to certain times of day when humans are not present. For example, freezers in commercial establishments may be monitored during early morning hours.

In certain embodiments, elements of the cooling system may be instrumented. For example, some commercially available freezers are shipped with temperature sensors installed in or around compressors, evaporators and conduits that carry Freon or other refrigerants. Typically, the temperature sensors are wired through a harness to one or more connectors for diagnostic and maintenance. In some embodiments, signals from these additional temperature sensors can be monitored by controllers provided according to certain aspects of the invention. The additional data derived from these signals can be analyzed to obtain additional baseline characteristics and to permit more precise identification of inefficiencies or dysfunction and to predict system failures. For example, temperature readings associated with various aspects of the cooling system can be used to characterize nominal and optimal cooling cycles.

In certain embodiments, a vibration sensor, such as a low frequency accelerometer, can detect vibration of a compressor. Compressor vibration normally occurs as a compressor is cycling on and/or off. The sensor can respond to changes in vibration patterns and/or can compare measured vibration to previously recorded or observed operating norms. Response may include an increased sampling rate which typically is interpreted by an application server as an alert. An alert may be processed when vibration occurs at an abnormal time interval. For example, a longer than normal vibration, or vibration at an unexpected time within the compressor cycle. Extended periods of observed vibration can provide a baseline for normal compressor function. In at least some embodiments, the vibration sensor may detect unusual vibrations that may be attributable to external events such as earthquakes or relocation of a refrigeration unit.

In certain embodiments, performance of refrigeration units, compressors and alerts can be presented to users at a console or monitor. Users may access a monitoring system using an Internet application or browser, through a smartphone application, using a computer or tablet, or by any suitable system that supports user interactions with a networked console or control application. By means of a graphical user interface accessed via any Internet browser, user-specific data can be accessed from an application server 28 using a distinct login ID/password. Online macros may score the performance of each freezer. In one embodiment, a letter grade of A, B, C or F can be assigned to compare the unit with a baseline grade or peer performance. For example, freezers assigned a grade of C or F can be marked and shut down for preventive maintenance, while freezers rated with an A or a B grade may be allowed to remain in operation with no planned preventative maintenance.

If preventive maintenance is performed, a user, such as the service technician, can manually enter data into the online system. The user can track potential problems, allowing for intervention before failure occurs. Certain embodiments of the invention may also allow the user to select a logic function to predict future performance. This function can allow the user to input scenarios that project total cost of ownership for each system. The function can also calculate potential savings of economy, if, for example, F-grade freezers were to run at B-grade efficiency levels. By identifying systems with a low grade, total non-operational time for all systems, cost for repair, and risk to the materials being stored can be reduced.

Certain embodiments of the invention can map 2D images, such as a floor plan, of a structure to create a 3D representation of a refrigeration unit and other objects housed with varying elevation or user-defined region of the structure. A user can manipulate the 2D image(s), which can be reflected in pseudo-real time in the 3D structure, without the use of a separate animation software. The refrigeration unit can be classified within a database to control for use and context, and a hierarchical relationship may be created to simplify management of the refrigeration unit and structures. The refrigeration unit may be displayed in a single view, including all units on all floors in a structure or multiple structures, or in discrete views by regions. Floors can also be hidden from view in order to simplify multi-floor structures. Certain embodiments can provide further details of a selected 3D view of a floor to be shown in a 2D map, in order to manage information and placement of objects. Other embodiments of the invention can enable the user to manipulate the 3D view, while the objects maintain position relative to an established coordinate system.

Figure 7:
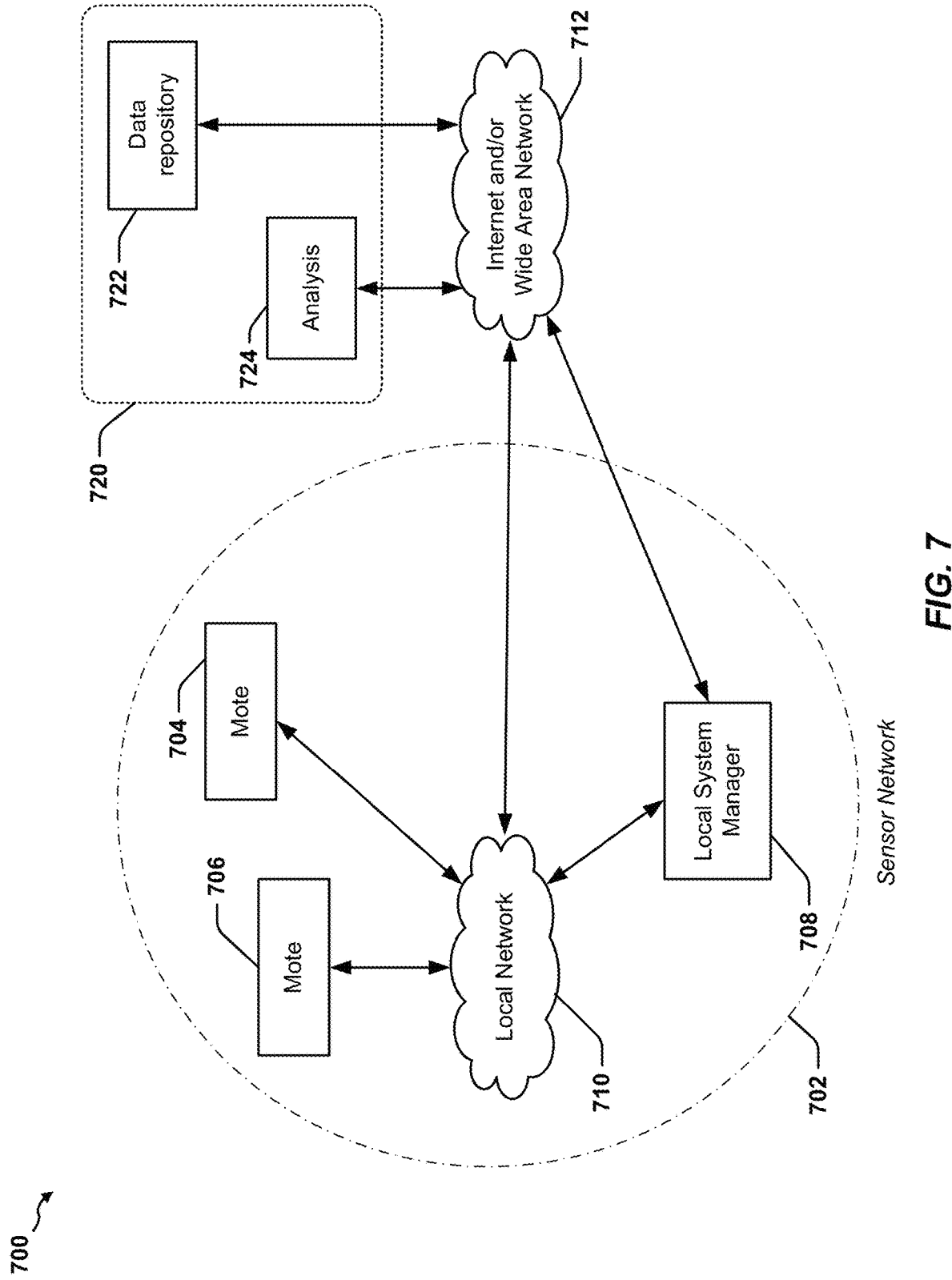
FIG. 7 illustrates a system for managing a network of refrigeration assets according to certain aspects disclosed herein.

FIG. 7 illustrates an example of a system 700 configured to provide centralized or distributed control of assets and/or monitoring of assets. Motes 704, 706 may be deployed to communicate with, and/or control sensors that monitor certain aspects of a plurality of corresponding refrigeration systems. In a large installation or on a large campus, a sensor network 702 may be configured to more efficiently collect and distribute sensor data sampled by Motes 704, 706 from sensors, and/or from other sources associated with refrigeration assets on the campus. The sensor network 702 may conform to a hierarchical architecture. In one example, a sensor network 702 may have one or more local system managers 708 that are deployed to collect and/or aggregate sensor data and other information provided by the Motes 704, 706. A local system manager 708 may manage and/or comprise a network of controllers and/or device managers. The Motes 704, 706 and the local system manager 708 may communicate through a local network 710, which may comprise a wired or wireless network.

The sensor network 702 may be coupled to a processing system 720 through a network 712 that may comprise a proprietary wide area network and/or a public wide area network such as the Internet. The processing system 720 may be centralized or distributed over a plurality of networked computing systems. The processing system 720 may provide a plurality of functional elements and devices, including a data repository 722, which may include a database system, an analysis system 724 that may be configured to process and analyze measurements, statistical data and trends, metadata and other information received from the sensor network 702. The analysis system 724 may employ historical data, profiles, design goals and other information maintained by the data repository 722 to review, process and otherwise analyze information received from the sensor network 702. The processing system 720 may include a sensor management system that monitors sensor operation and can detect failure of one or more sensors using information received or retrieved from the sensor network 702, the analysis system 724 and/or the data repository 722.

In certain embodiments, Motes 704, 706 and local system managers 708 of the sensor network 702 may communicate using connectionless communications systems. For example, one or more sensors may use a messaging service such as a Short Message System (SMS) cellular or a Multimedia Messaging Service (MMS). Other communications methods may be employed, including routable networks. In one example, communication within the sensor network 702 and between the sensor network 702 and public or private wide area networks may be based on protocols that establish a session used to exchange commands and data. In one example, communications may be facilitated through the use of protocols that establish a contiguous packet-based data connection utilizing a single routable protocol or other session comprised of non-contiguous data connections used to exchange commands and data.

Figure 8:
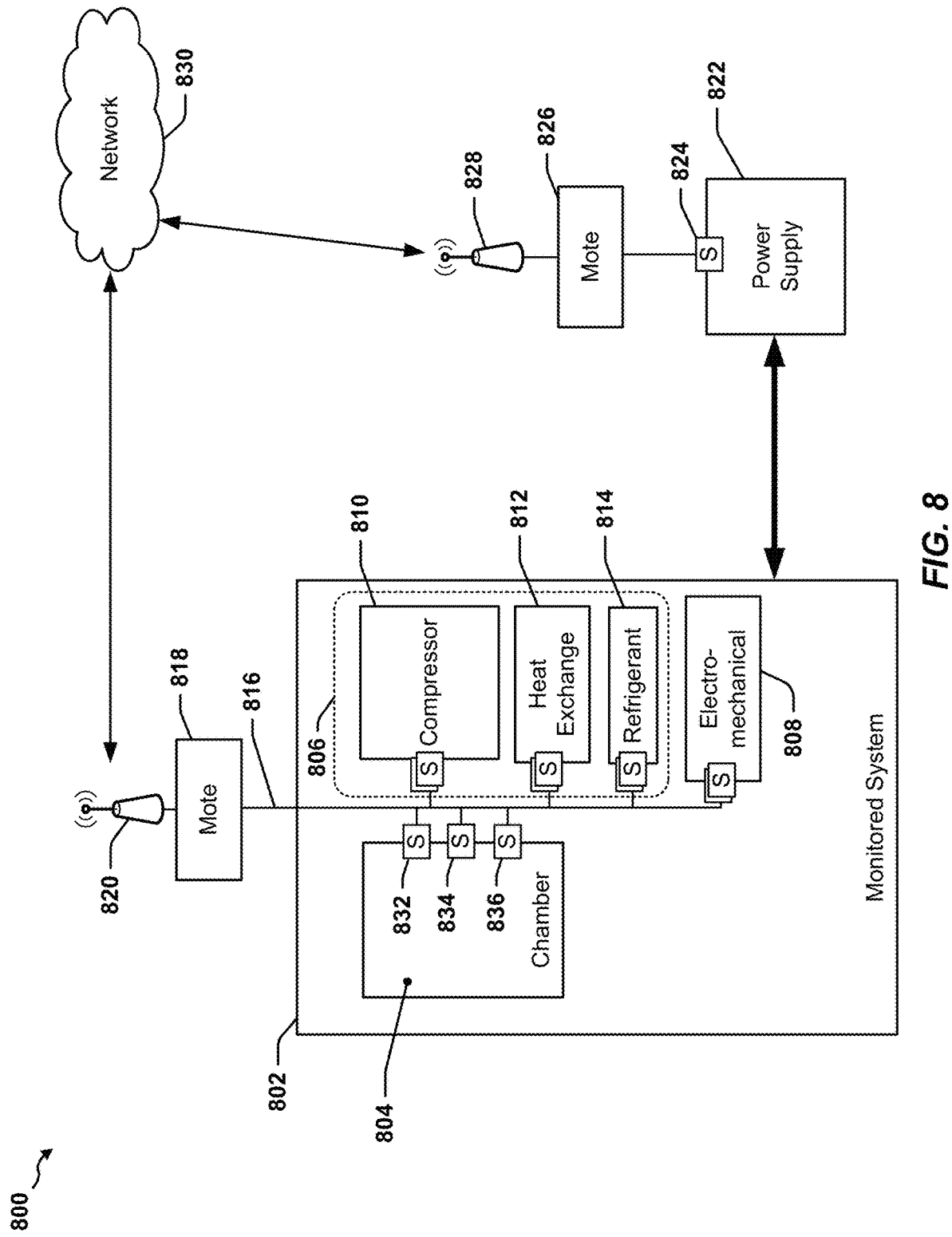
FIG. 8 illustrates a refrigeration system instrumented with sensors and other monitoring circuitry according to certain aspects disclosed herein.

FIG. 8 illustrates an example 800 in which a refrigeration system 802 is a monitored asset. For the purposes of this description, a refrigeration system 802 may comprise one or more of a freezer, refrigerator, storage space and/or room in which the temperature is controlled in order to maintain contents of a storage space or chamber 804 within a desired or required temperature range. The concepts disclosed herein apply equally to systems used to monitor HVAC performance within a building or within an individual room in a building. The concepts disclosed herein apply equally to systems used to maintain environmental conditions for a material that is being transported within a vehicle, container or package.

In the illustrated example, the refrigeration system 802 may be fitted with sensors coupled by a sensor bus 816 with a Mote 818. Each component may be instrumented using multiple sensors, two or more of which may be configured to measure and/or monitor an environmental condition, operating condition, thermodynamic refrigeration cycle, power supply, and/or other systems, characteristics and attributes associated with the refrigeration system 802. In one example, multiple sensors 832, 834, 836 may be provided in the cooled chamber 804 of a monitored refrigeration system 802. The combination of a Mote 818 and one or more sensors 832, 834, 836 monitored or controlled by the Mote 818 may also be referred to as a smart sensor. In some instances, the sensors 832, 834, 836 may include smart sensors that include internal circuits and modules that enable the sensors to communicate with a network 830 directly or through an intermediary device (e.g., Mote 818 or aggregator 206).

Certain duplicate sensors are employed for monitoring equipment location and/or to measure electrical current, voltage, door position, vibration, temperature, pressure, mechanical strain, vibrations within or surrounding the refrigeration system 802 and other characteristics of the refrigeration system 802. The refrigeration system 802 may have more than one chamber 804 or other storage space that is maintained at a desired temperature by a refrigeration system 806. In one example, the refrigeration system 806 may include a compressor 810, a heat exchange system 812, a refrigerant circulation 814 and other electromechanical components 808.

In some implementations, a second Mote 826 (or smart sensor) may be provided to monitor power consumption of one or more refrigeration systems 802 or other assets using sensors 824 or other instruments. One or more sensors 824 may be connected to one or more Motes 826, in a sub-panel for example, to collect data from more than one refrigeration system. The second Mote 826 may monitor current and/or voltage sensors associated with powered components of the refrigeration system 802 including, for example, the compressor 810, pumps, valves and other rotating machinery or electromechanical components 808.

In some instances, the Motes 818, 826 may be implemented using a smart module that has a processing circuit, storage and one or more transceivers operable to connect the Motes 818, 826 to each other or to the network 830 continuously, continually, opportunistically or when a network connection is available. One or more of the Motes 818, 826 may operate as a data logger that stores various information received or generated by the Motes 818, 826. In some instances, the Motes 818, 826 may be adapted to perform certain data processing tasks on sensor data.

In some examples, equipment location, analytical measurements and other information obtained from other sources may include descriptive, qualitative or quantitative data entered manually at or near the refrigeration system 802, or entered through a networked console, terminal, mobile computing device and communicated through the network 830. In one example, information representing equipment location and/or other manual measurements taken during the service or maintenance of the system may be provided through the mobile computing device 208 illustrated in FIG. 2. Power-related measurements may be directly or indirectly obtained from sensors 824, 832, 834, 836, and energy consumption may be accurately calculated by measuring amperage and voltage periodically or continuously. In some instances, energy consumption may be estimated or calculated from secondary measurements, such as temperature variations, thermodynamic refrigeration cycle frequency, total current consumption by a plurality of assets, etc. For example, energy consumption may be determined by correlating temperature or measurements related to a thermodynamic refrigeration cycle with current flow in an electrical main.

In some instances, a Mote 818, 826 may survey a plurality of sensors 824, 832, 834, 836 or otherwise receive measurements from the sensors 824, 832, 834, 836 on a periodic basis. The Motes 818, 826 may be configured to process the measurements to generate raw statistical data and perform certain filtering or statistical analyses, such as identifying trends, transitions from normal to abnormal operation based on crossings of threshold values, etc. The Motes 818, 826 may be configured to store and maintain a history of measurements, trend information and other metadata. The Motes 818, 826 may be configured to use a wired or wireless network interface 820, 828 to transmit stored information, raw measurements, alarms and status information and may signal occurrences of exceptions to normal operation to other Motes 820, 826 or to a gateway, centralized or distributed data collection or monitoring system and/or a centralized or distributed controlling system. The network interfaces 820, 828 may support communications with a network 830 that may comprise local networks, ad hoc networks, proprietary wide area networks and/or public networks including the Internet.

According to certain aspects, the operational reliability of certain sensors 824, 832, 834, 836 may be determined based on comparisons between sensors measuring the same quantity, or with reference to sensor measurements of one or more correlated quantity correlated.

Comparative analyses of sensors may be used to dynamically and/or continuously calibrate sensors measuring the same quantity. Dynamic calibration permits a monitoring system to recalibrate the sensors at any time without labor or the need for dedicated calibration equipment at the system that is instrumented by the sensors.

Figure 9:
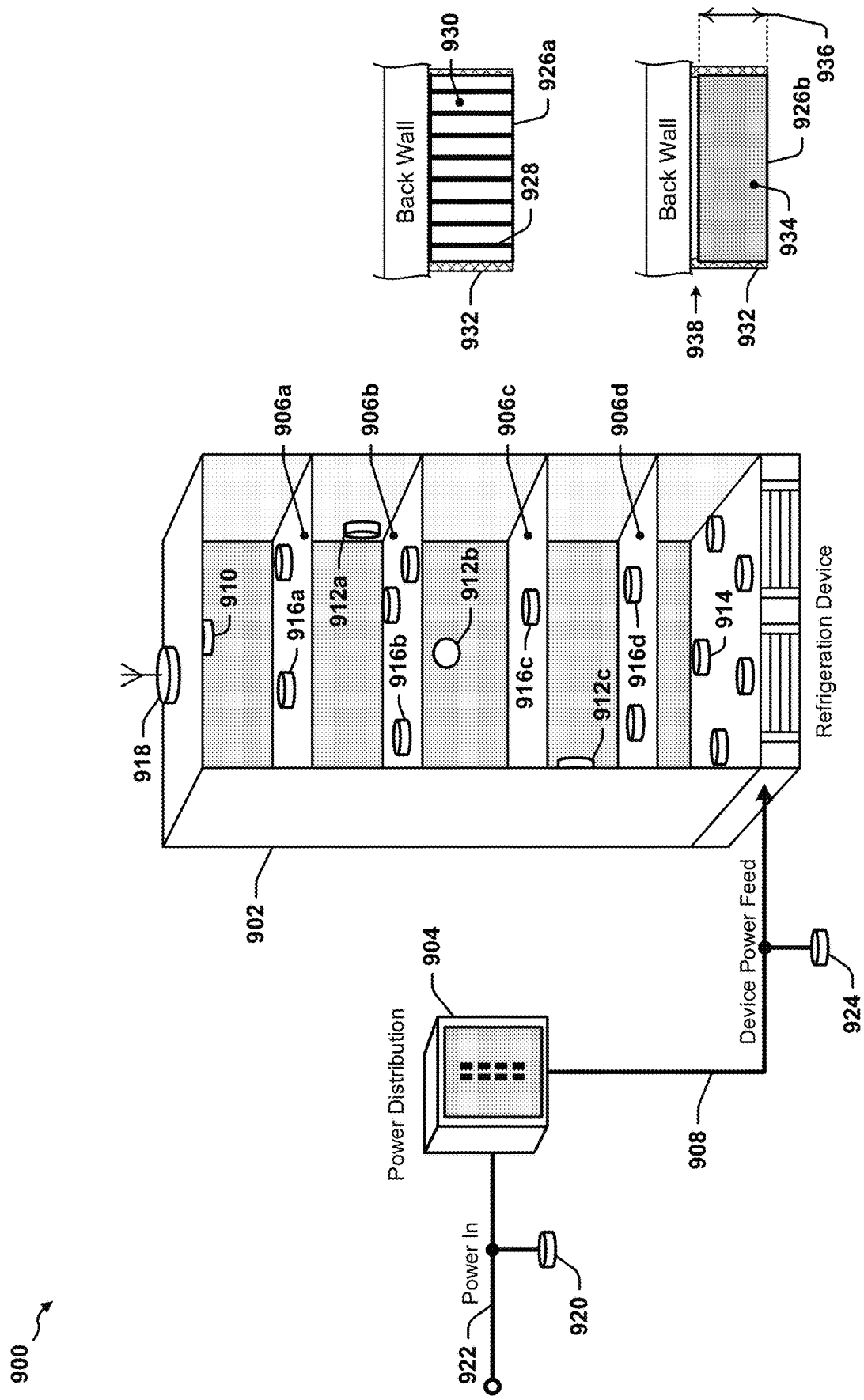
FIG. 9 illustrates a second example of a refrigeration unit subject to monitoring in accordance with certain aspects disclosed herein.

FIG. 9 illustrates an example of a monitored system 900 that includes a refrigeration device 902 instrumented with sensors that may be dynamically and/or continuously calibrated in accordance with certain aspects disclosed herein. The refrigeration device 902, which may correspond in some respects to the freezer 300 of FIG. 3, has multiple shelves 906a, 906b, 906c, 906d that effectively create multiple zones within the refrigeration device 902, and is instrumented with sensors 910, 912a, 912b, 912c, 914, 916a, 916b, 916c, 916d that communicate through a mote 918.

Location of the sensors can be selected to accommodate structure of the space or spaces to be monitored, presence or absence of shelves and other features that may obstruct airflow, including expected location of stored materials and other factors. In one example, at least one sensor 910, 912a-912c, 914, 916a-916d is provided to measure temperature within each zone defined by sidewalls and shelves 906a, 906b, 906c, 906d of the refrigeration device 902. In other examples, one or more zones may be defined independently of sidewalls and/or shelves 906a, 906b, 906c, 906d of the refrigeration device 902, and each of these zones may be instrumented using one or more sensors. Sensors 910, 912a-912c, 914, 916a-916d can be placed at various points in three-dimensional space within a chamber. For example, certain sensors 916a-916d can be placed in the front, back or middle of a shelf 906a, 906b, 906c, 906d, each shelf may have multiple sensors, other sensors 912a 912b, 912c may be placed at any available location on the surface on or within an inner vertical surface (e.g. sidewall, backwall or door) of the refrigeration device 902, and some sensors 910, 914 be placed at any available location on an inner horizontal surface of the refrigeration device 902.

In some implementations, sensors may be used to measure vibration, current and/or flow of refrigerants. Location of sensors 910, 912a-912c, 914, 916a-916d may be selected to optimize coverage in three-dimensional (3D) space. For example, a first sensor 912a may be located on a first sidewall of the refrigeration device 902 and a second sensor 912c may be located on a second sidewall of the refrigeration device 902, where the first sensor 912a is positioned deeper into the chamber of the refrigeration device 902 than the second sensor 912c.

The shelves 906a, 906b, 906c, 906d may be constructed with a variety of designs. In one example, a shelf 926a may have a slatted design and may be supported by hangars 932, whereby objects and materials are placed on slats 928 that are separated by spaces 930 configured to permit relatively free flow of air within the chamber of the refrigeration device 902. In another example, a shelf 926b may have a solid planar surface 934 design and may be supported by hangars 932, where the shelf 926b has a side dimension 936 that is less than the depth of the chamber of the refrigeration device 902, thereby providing a gap 938 that permits a vertical flow of air within the chamber of the refrigeration device 902.

The shelves 906a, 906b, 906c, 906d and materials stored in the chamber of the refrigeration device 902 can impede air flow between zones of the chamber of the refrigeration device 902 and the reduced or impeded airflow can cause disparities in readings of the sensors 910, 912a-912c, 914, 916a-916d. Airflow can be different for different loading conditions of the refrigeration device 902.

Figure 10:
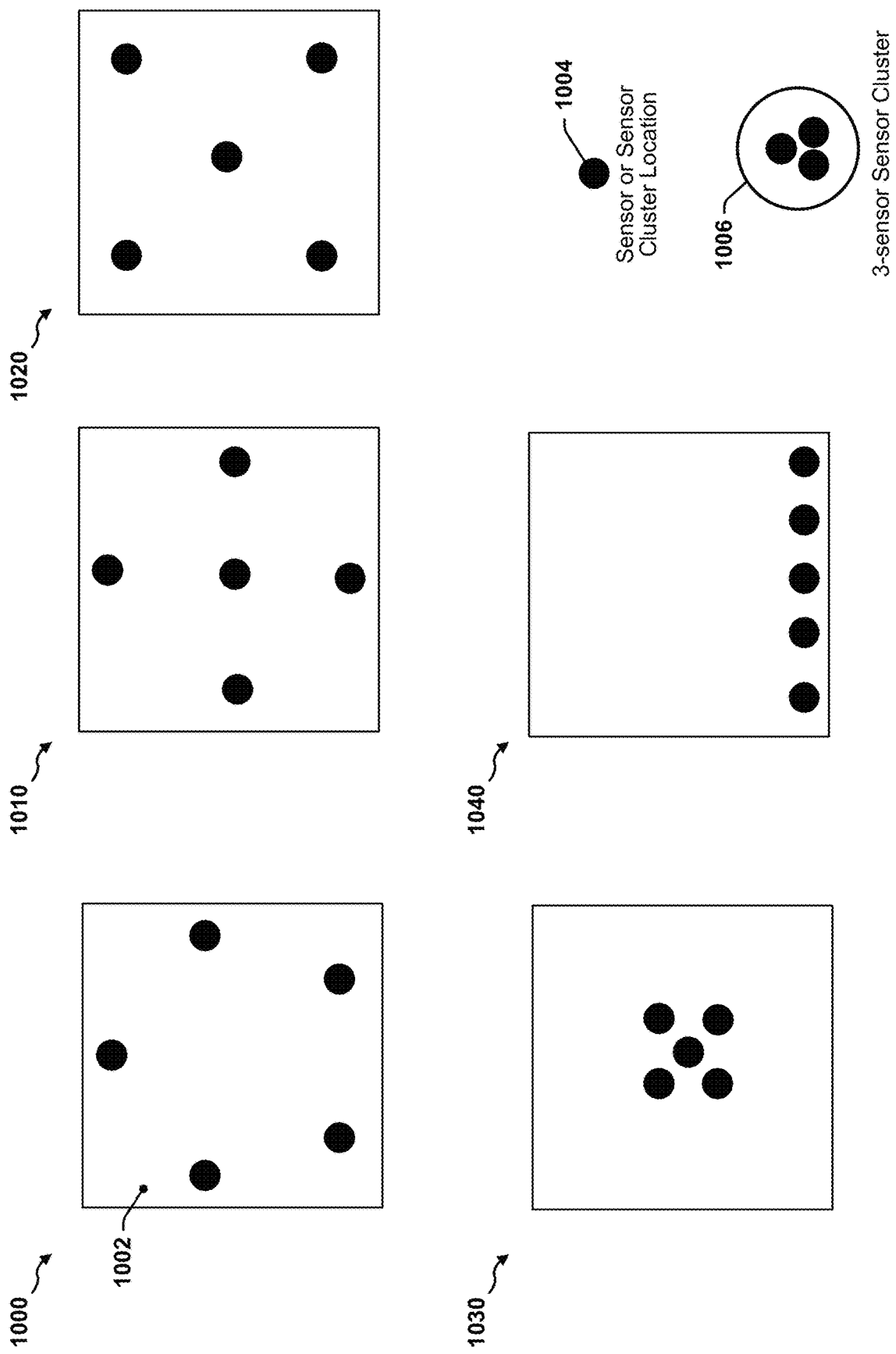
FIG. 10 illustrates sensor layout within a temperature-controlled asset in accordance with certain aspects disclosed herein.

FIG. 10 illustrates certain examples of sensor layouts 1000, 1010, 1020, 1030, 1040 on a shelf, floor, ceiling or wall of a temperature-controlled asset. The examples relate to the arrangement or configuration of five locations 1004 in which sensing devices may be located, embedded or attached. A single sensor or a cluster of sensors 1006 may be deployed at each location 1004. In some implementations, individual sensors in a cluster of sensors 1006 may be monitored independently. In some implementations, two or more sensors of the same type in a cluster of sensors 1006 may be controlled locally and may report a combined or average measurement. In some implementations, two or more sensors of the same type in a cluster of sensors 1006 may be calibrated with respect to one another using certain techniques disclosed herein. In some implementations, two or more different types of sensors may be provided in a cluster of sensors 1006. The number and type of sensors included in a cluster of sensors 1006 may be determined on an application-by application basis.

In FIG. 10 the illustrated sensor layouts 1000, 1010, 1020, 1030, 1040 represent a subset of the possible layouts that may be defined for an asset or application when locations 1004 are desired or required. Fewer or more locations may be defined for one or more of the shelves, floors, ceilings or walls of a temperature-controlled asset. The illustrated sensor layouts 1000, 1010, 1020, 1030, 1040 define a generally symmetric arrangement of locations 1004. In various implementations, non-symmetric layouts may be configured.

In some implementations, one or more sensors may be individually placed, attached, embedded or fixed to a shelf, wall, floor, ceiling or partition in a temperature-controlled asset. The one or more sensors may be removably placed on the shelf, wall, floor, ceiling or partition such that a sensor can be relocated at a later time. In one example, the one or more sensors may be placed without fastening or adhesive. In another example, each sensor may be fixed in place using a fastener, an adhesive or an adhesive device or material such as VELCRO® or a removable/restickable glue. In another example, certain sensors may be embedded in the shelf, wall, floor, ceiling or partition during manufacture or assembly.

Figure 11:
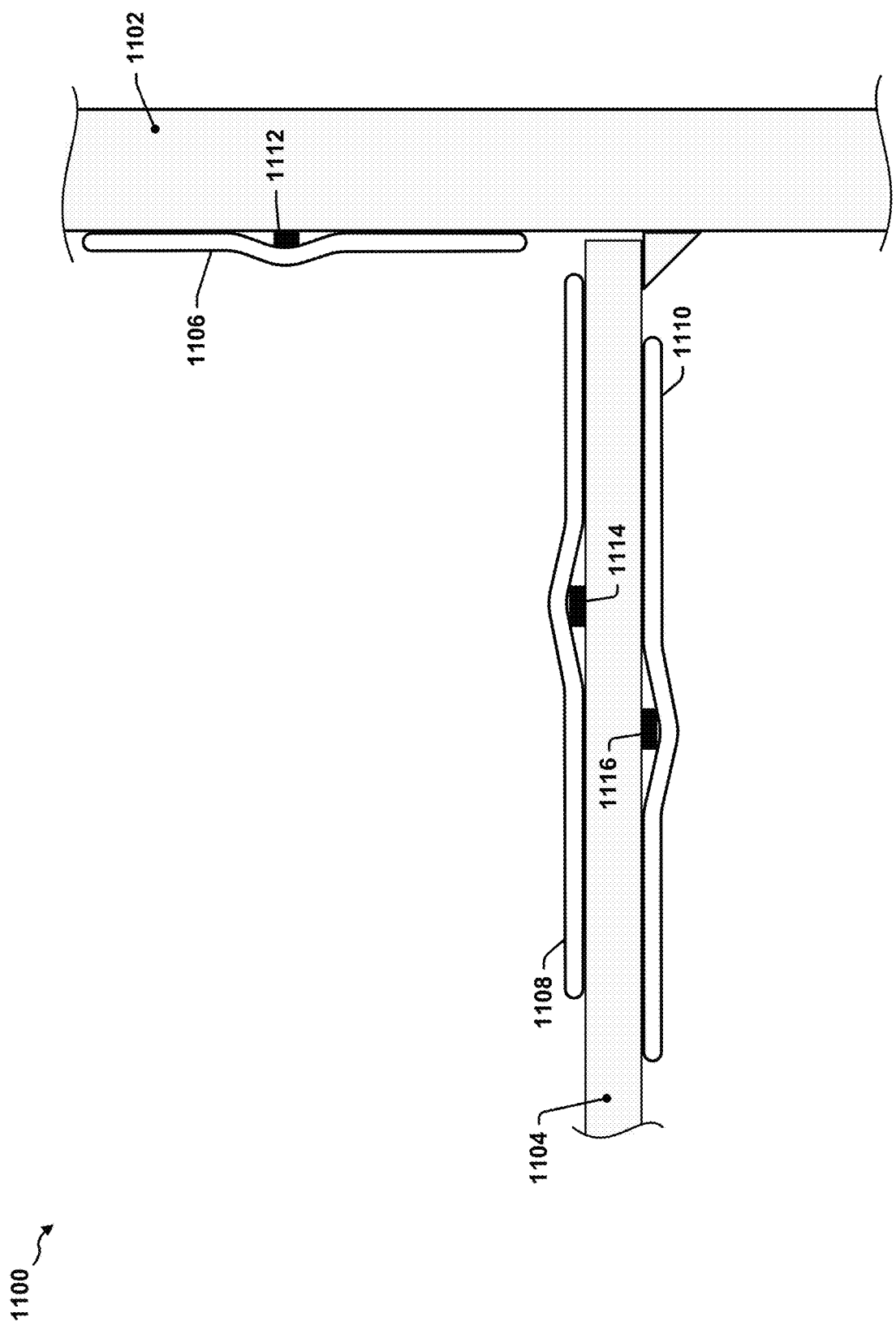
FIG. 11 illustrates a first example of a laminated sensor configured in accordance with certain aspects of the disclosure.

In some implementations, one or more sensors may be grouped, protected and/or fixed in a desired location using lamination. FIG. 11 illustrates a first lamination example 1100 in which sensors 1112, 1114, 1116 are held in place by respective laminating sheets 1106, 1108, 1110. A first sensor 1112 may be held in place against a vertical member 1102 (e.g. a sidewall, backwall, door, shelf support element etc.) by a first laminating sheet 1106. The first laminating sheet 1106 may be coated with an adhesive to provide an adhesive surface can attach the first laminating sheet 1106 to the vertical member 1102. A second sensor 1114 may be fixed by a second laminating sheet 1108 to a top or upper surface of a shelf 1104 or other element that has at least a partial horizontal orientation. A third sensor 1116 may be fixed by a second laminating sheet 1110 to a bottom or lower surface of the shelf 1104 or other element that has at least a partial horizontal orientation.

Figure 12:
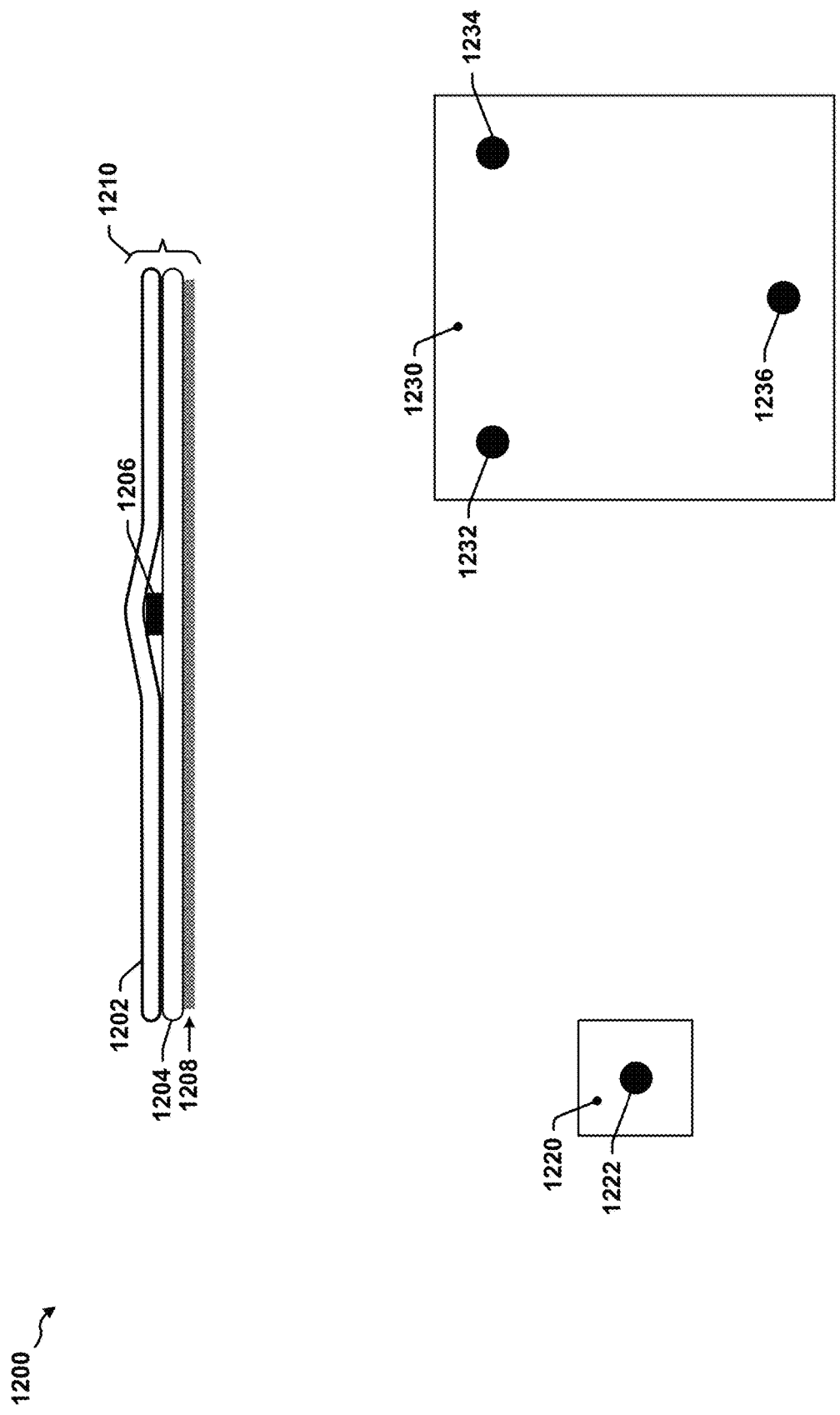
FIG. 12 illustrates a second example of a laminated sensor configured in accordance with certain aspects of the disclosure.

FIG. 12 illustrates a second lamination example 1200 in which a sensor 1206 is sandwiched between two laminating sheets 1202, 1204 to form a sensing device. The sensing device may be referred to as a temperature sensing surface, temperature sensing device, temperature sensing patch, temperature mat, temperature dot, sensor mat, sensor dot, or the like. Certain aspects described in relation to lamination apply equally to a device that is constructed differently, configured or otherwise used as a partition or shelf and in which one or more sensors 1206 have been embedded. The sensing device may be employed in a variety of applications or locations. In one example, laminating sheets 1202, 1204 may be fastened together by an adhesive, heat treatment, crimping, or other technique suitable for the material used to form the laminating sheets 1202, 1204. In certain implementations, a temperature mat that carries or includes one or more sensors may be placed on a removably placed on a shelf or floor, such that the temperature mat can be later moved or removed as needed or desired. In some instances, a temperature mat can be installed vertically on a shelf, for example, disposed between boxes, containers, bottles, drawers, or the like.

In some implementations, an adhesive 1208 applied to the outer surface of one laminating sheet 1202 may enable the resultant laminated sensor 1210 to be attached to a surface of a device to be monitored. In one example, a lower surface of each of the two thermally conductive laminating sheets 1202, 1204 has an adhesive 1208 applied, and the laminating sheets 1202, 1204 may be fastened when the adhesive layer on the lower surface of an upper laminating sheet 1202 is contacted to at least a portion of the upper surface of a lower laminating sheet 1204, enclosing the sensor 1206 between the laminating sheets 1202, 1204. Laminated sheets 1202, 1204 may comprised of two layers of lamination with sensors in the middle, placed under, between or on top of storage boxes or against the wall with options for spacing from the wall to avoid thermal transfer.

In a first example, a laminated sensor 1220 includes a single sensor 1222, and the laminated sensor 1220 can be mounted and held in place against a surface within a volume to be monitored. The laminated sensor 1220 may occupy a relatively small area of the surface. In a second example, a laminated sensor 1230 includes multiple sensors 1232, 1234, 1236 that may be arranged in a desired configuration before placement within the volume to be monitored. Multiple copies of the laminated sensor 1230 may be manufactured by equipment that can consistently reproduce copies of the laminated sensor 1230 such that spatial and temporal baselines derived from measurements obtained from some instances of the laminated sensor 1230 can be used to calibrate other instances of the laminated sensor 1230. In some implementations, the laminated sensors 1210, 1220, 1230 may be produced without an adhesive 1208 applied to an external laminating sheet 1204.

Referring again to FIG. 9 a monitoring system configured in accordance with certain aspects disclosed herein can continuously recalibrate the sensors 910, 912$a$-912$c$, 914, 916$a$-916$d$ to account for changing circumstances and/or changes in performance of one or more sensors 910, 912$a$-912$c$, 914, 916$a$-916$d$. The monitoring system may be configured to use measurements of a static condition of the monitored system 900 obtained by a combination of sensors to calibrate or recalibrate one or more of the sensors 910, 912$a$-912$c$, 914, 916$a$-916$d$. The monitoring system may be further configured to generate and/or use baseline characteristics that represent individual sensors 910, 912$a$-912$c$, 914, 916$a$-916$d$ and combinations of sensors under a variety of operational conditions. The monitoring system may be configured to generate and/or use baseline characteristics that represent individual sensors 910, 912$a$-912$c$, 914, 916$a$-916$d$ and combinations of sensors under a variety of operational conditions. In some instances, the baseline characteristics may reflect information generated for similar sensors deployed in refrigeration device 902 of the same type and/or baseline information provided by a manufacturer of the refrigeration device 902.

In one example, the sensors 910, 912$a$-912$c$, 914, 916$a$-916$d$ may be initially calibrated while the shelves 906$a$, 906$b$, 906$c$, 906$d$ of the refrigeration device 902 are empty. The initial calibration may include static and/or dynamic calibration processes. The static calibration process may be performed when the temperature within the chamber of the refrigeration device 902 is stable, as indicated by unchanging temperature measurements obtained by the sensors 910, 912$a$-912$c$, 914, 916$a$-916$d$ located within the chamber of the refrigeration device 902. A free flow of air can be expected within an empty chamber of the refrigeration device 902, and the temperature throughout the chamber of the refrigeration device 902 can be expected to be constant, and temperature measurements obtained by the sensors 910, 912$a$-912$c$, 914, 916$a$-916$d$ can be expected to be constant, or to be changing very slowly. In one example, the initial static calibration may include determining current temperature within the chamber of the refrigeration device 902 based on a pre-calibrated sensor placed within the chamber of the refrigeration device 902. In another example, each of the sensors 910, 912$a$-912$c$, 914, 916$a$-916$d$ may be calibrated during manufacture, assembly or servicing of the refrigeration device 902 and the current temperature within the chamber of the refrigeration device 902 may be determined as the temperature indicated by a majority of the sensors 910, 912a-912c, 914, 916a-916d, or as an average or median of the temperatures indicated by the sensors 910, 912a-912c, 914, 916a-916d or a subset of the sensors 910, 912a-912c, 914, 916a-916d. Static calibration processes may be continuously or continually performed after the initial calibration.

FIG. 12 illustrates a laminated sensor 1200 that includes an array of five sensors 1202, 1204, 1206, 1208, 1210 and that may be peer-evaluated. Certain aspects of the peer evaluation techniques are applicable to arrays of sensors that are mounted independently, and/or configured in a variety of 3-dimensional alignments of two or more sensors 912a-912c, 914, 916a-916d. In the illustrated example, peer-evaluation for single sensors 1202, 1204, 1206, 1208, 1210 is visualized as a pentagon 1220, and Table 1 below depicts an example in which the five sensors 1202, 1204, 1206, 1208, 1210 in an asset are peer-evaluated. Peer evaluation may employ various machine learning and artificial intelligence techniques, including neural networks, means and population testing, pattern matching, auto-correlation, covariance, analysis of variance (ANOVA), multivariate analysis of variance (MANOVA), autoregressive integrated moving average (ARIMA), seasonal autoregressive integrated moving average (SARIMA) or stepwise regression techniques just to name just a few, which may be employed to identify correlations among peers in a plurality of sensors, or with respect to other comparable assets or peer groups in a population. For each sensor 1202, 1204, 1206, 1208, 1210 under test, a model may be developed that can report overall fit, accuracy and confidence interval based upon correlation of the sensor 1202, 1204, 1206, 1208, 1210 under test with one or more of its peer sensors 1202, 1204, 1206, 1208, 1210 acting as a multi-variate or linear system. In one example, tests are configured to run periodically to determine if any of the sensors have lost correlation or fit.

TABLE 1

| Sensor Under Test | Voting Peers (Coefficient of Correlation) | | | | |
|---|---|---|---|---|---|
| | 1 | 2 | 3 | 4 | 5 |
| 1 | 100% | 97% | 93% | 92% | 97% |
| 2 | | 100% | 96% | 95% | 99% |
| 3 | | 95% | 100% | 97% | 94% |
| 4 | | 97% | 93% | 100% | 97% |
| 5 | | 92% | 96% | 95% | 100% |

Figure 13:
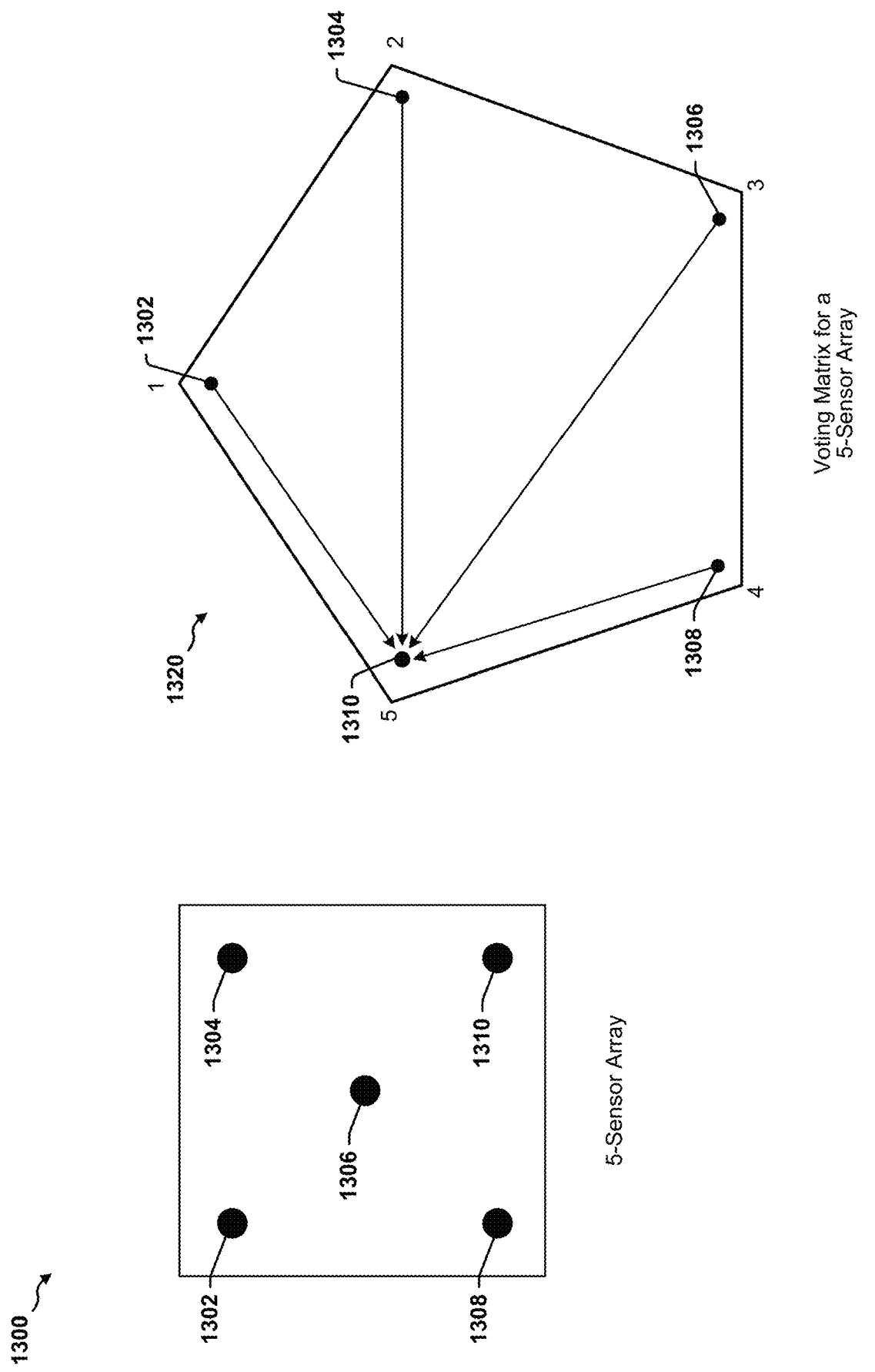
FIG. 13 illustrates a third example of a laminated sensor configured in accordance with certain aspects of the disclosure.

With reference to FIG. 13, in some implementations, the sensors 1302, 1304, 1306, 1308, 1310 in the laminated sensor 1300 or clusters of individual sensors 910, 912a-912c, 914, 916a-916d may be coupled to a sensor hub, where two or more sensors (e.g., thermocouples) communicate through a sensor hub. In one example, initial validation includes validating the sensor array in a laminated sensor 1300 placed on each of the four shelves 906a, 906b, 906c, 906d, and/or the individual sensors 1302, 1304, 1306, 1308, 1310 in each laminated sensor 1300. Initial validation of the twenty sensors and the four arrays can involve a prolonged process. In some instances, a validation lasting two or more days may be needed to obtain an initial and highly accurate characterization of temperature gradients. Peer evaluation implemented using voting analytics can be used to characterize and/or calibrate individual sensors 1302, 1304, 1306, 1308, 1310, one or more laminated sensor 1300, and the set of four laminated sensor 1300. In one example, autocorrelation techniques may be used to find correlations, and variances may be analyzed to detect loss of correlation over time with regard to baseline characteristics. Statistical methods and other techniques can be employed to determine which sensors provide, or are associated with highest correlations.

After initial validation and calibration, individual sensors and/or laminated sensors 1300 with highest correlations can be operated within the volume or enclosure to be monitored, typically after it has been determined that a subset of such sensors can provide a second reliable measurement system in substitution or comparison. In some instances, other sensors may be physically removed, disconnected or the data ignored to simplify installation or to reduce deployment costs, and based on a determination that the quality of their contribution, or lack thereof, to the overall accuracy of the calibration method.

In some implementations, substitute measurements may be provided by the group of peers that evaluated and voted on the accuracy of a sensor that is physically removed, disconnected, deemed unable to be recalibrated to required limits of accuracy or confidence, or ignored during initial or dynamic calibration. For example, a first sensor under test may be deemed to be an inaccurate sensor based on voting by a group of 8 peer devices. Measurements provided by the inaccurate sensor may thereafter be ignored and replaced by substitute measurements generated from the plurality of sensors not under test, using machine learning and artificial intelligence techniques, including neural networks, means and population testing, pattern matching, auto-correlation, covariance, ANOVA, MANOVA, ARIMA, SARIMA or stepwise regression techniques. The group of 8 peer devices of known accuracy are capable of providing inferred or estimated substitute measurements for the first sensor for the same reasons the group of 8 peers are able to determine the amount of error for the first sensor.

In one example, a processing system may determine a loss of calibration or accuracy of the first sensor based on a determination that the first sensor has lost correlation or covariance with its peers. The processing system may ignore measurements provided by the first sensor when the first sensor is determined to have lost correlation or covariance with a plurality of peer sensors and to substitute the measurements provided by the first sensor with estimated measurements generated for the first sensor by the plurality of peer sensors, with the accuracy and confidence necessary to deem the substituted values acceptable.

Certain industry organizations define and promulgate standards, practices and guidance for sensor calibration. In the United States for example, National Institute of Standards and Technology (NIST) traceable calibration instruments may be used to test or characterize the accuracy of a temperature measurement device. The calibration process includes taking measurements using the sensor and applying corrections to remove any apparent error until the sensor under test and the NIST calibration instrument measure the same value.

In another example, a measurement error or calibration error in a sensor may be detected based on a loss of correlation with one or more peer devices. An amount of correction applied to the sensor under test may be sufficient to restore its correlation with the peer devices. In some instances, the sensor may experience an unexpected or unexplained loss of calibration after a period of time. The loss of calibration may be unexpected or unexplained when it occurs within a period of time that is shorter than may be anticipated for the type of device. The loss of calibration may be unexpected or unexplained when calibration occurs repeatedly and at a rate that is greater than expected for the type of device. A system may deem the physical sensor as unusable or defective and may substitute deemed measurements of known accuracy derived from the historical analysis of correlations of the physical sensor with its peer devices. The deemed measurements may be generated based on measurements obtained from one or more peer devices.

Turning again to FIG. 9, a dynamic calibration process or temperature validation process may be performed when the temperature within the chamber of the refrigeration device 902 varies over time when the chamber of the refrigeration device 902 is empty. A free flow of air can be expected within an empty chamber of the refrigeration device 902, and the temperature throughout the chamber of the refrigeration device 902 can be expected to be consistent. Cycles in temperature measurements obtained by the sensors 910, 912a-912c, 914, 916a-916d can be analyzed when calibrating the temperature within the chamber of the refrigeration device 902. For example, the measurements obtained by the sensors 910, 912a-912c, 914, 916a-916d may exhibit a similar cycle and/or range of temperatures, where changes in temperature at one location within the chamber lag corresponding changes in temperature at another point within the chamber. In one example, the initial static calibration may include determining current temperature within the chamber of the refrigeration device 902 based on a pre-calibrated sensor placed within the chamber of the refrigeration device 902. In another example, each of the sensors 910, 912a-912c, 914, 916a-916d may be calibrated during manufacture, assembly or servicing of the refrigeration device 902 and the current temperature within the chamber of the refrigeration device 902 may be determined as the lag-adjusted temperature indicated by a majority of the sensors 910, 912a-912c, 914, 916a-916d, or as an average or median of the lag-adjusted temperatures indicated by the sensors 910, 912a-912c, 914, 916a-916d or a subset of the sensors 910, 912a-912c, 914, 916a-916d.

The initial dynamic calibration process may be performed to define the responsiveness and/or sensitivity of individual sensors 910, 912a-912c, 914, 916a-916d, and may involve the use of a reference sensors placed in the chamber of the refrigeration device 902. Dynamic calibration processes may be continuously or continually performed after the initial calibration. Dynamic calibration may be performed as part of a temperature validation process.

According to certain aspects disclosed herein, dynamic calibration can be performed while the refrigeration device 902 is in operation. Dynamic calibration may be accomplished by comparing a current cycle of measurements with baseline cycles. Referring again to FIG. 6, the temperature characteristic 600 of a freezer compartment, which may be derived from temperatures monitored within the chamber of the refrigeration device 902 can be expected to be cyclic and may correspond to a compression cycle associated with the cooling system of the refrigeration device 902. The compressor or condenser cycle 610 may correspond to the compression cycle in the refrigeration device 902. Each sensor 910, 912a-912c, 914 can be expected to provide measurements that follow the compression cycle with a lag with respect to other sensors 910, 912a-912c, 914, 916a-916d. Calibration may involve a frequency domain analysis of the measurements received from each sensor 910, 912a-912c, 914, amplitude of temperature measurements and/or an analysis of lags or changes in lags between sensors 910, 912a-912c, 914, 916a-916d.

In a calibrated system, relationships between temperature cycles reported by each sensor can be established. In some instances, sensors may correctly report different maximum and/or minimum temperatures, reflecting a temperature imbalance within the chamber. The monitoring system may recognize that the sensors 910, 912a-912c, 914, 916a-916d are calibrated when the temperature cycles reported are consistent with baseline measurements. A sensor may be determined to be out of calibration when its reported temperature cycle vary from baseline and/or when differences between its reported temperature cycle and the temperature cycles reported by one or more other sensors 910, 912a-912c, 914, 916a-916d vary from baseline differences. In one example, a loss of individual sensor calibration may be identified when the difference in maximum or minimum temperatures of a cycle reported by two or more sensors 910, 912a-912c, 914, 916a-916d changes over time. Loss of calibration may be attributed to changes in sensor sensitivity or changes in conditions within the chamber of the refrigeration device 902. In some instances, changes in conditions within the chamber may be identified when variations are detected in the differences reported by multiple combinations of sensors 910, 912a-912c, 914, 916a-916d. For example, a change of conditions may be indicated when the difference in maximum temperature reported by a first pair of sensors 910, 912a changes concurrently with a change in the difference in minimum temperature reported by a second pair of sensors 912c, 914.

Changes in conditions within the chamber of the refrigeration device 902 may result from addition, relocation or removal of objects on one or more shelves 906a, 906b, 906c, 906d. Evidence of such changes may be provided by sudden changes in the compression cycle triggered by door opening events. The compression cycle may increase in frequency or the compressor may remain active for prolonged periods of time. Door open events may be recognized, and continuous or continual calibration processes may be suspended until the compression cycle has returned to an identifiable equilibrium.

Continuous or continual calibration may enable a monitoring system to adjust temperature readings from one or more sensors 910, 912a-912c, 914, 916a-916d when changes in temperature cycle cannot be attributed to changes in chamber conditions. The ability to continuously or continually calibrate sensors 910, 912a-912c, 914, 916a-916d can reduce maintenance costs and increase system reliability by increasing accuracy of predictions of failure of the refrigeration device 902.

In some implementations, the monitoring system may use information from other types of sensors 920, 924 to calibrate the sensors 910, 912a-912c, 914, 916a-916d that measure temperature within the chamber of the refrigeration device 902. In one example, the monitoring system may receive measurements of current flow in a power line 908 provided to the refrigeration device 902, where cycles in the current flow can establish the compression cycle associated with the refrigeration device 902. In another example, the monitoring system may receive measurements of current flow in a power line 922 provided to a power distribution panel 904 that feeds multiple refrigeration devices, where analysis of cycles in the current flow can establish the compression cycle associated with the refrigeration device 902.

Figure 14:
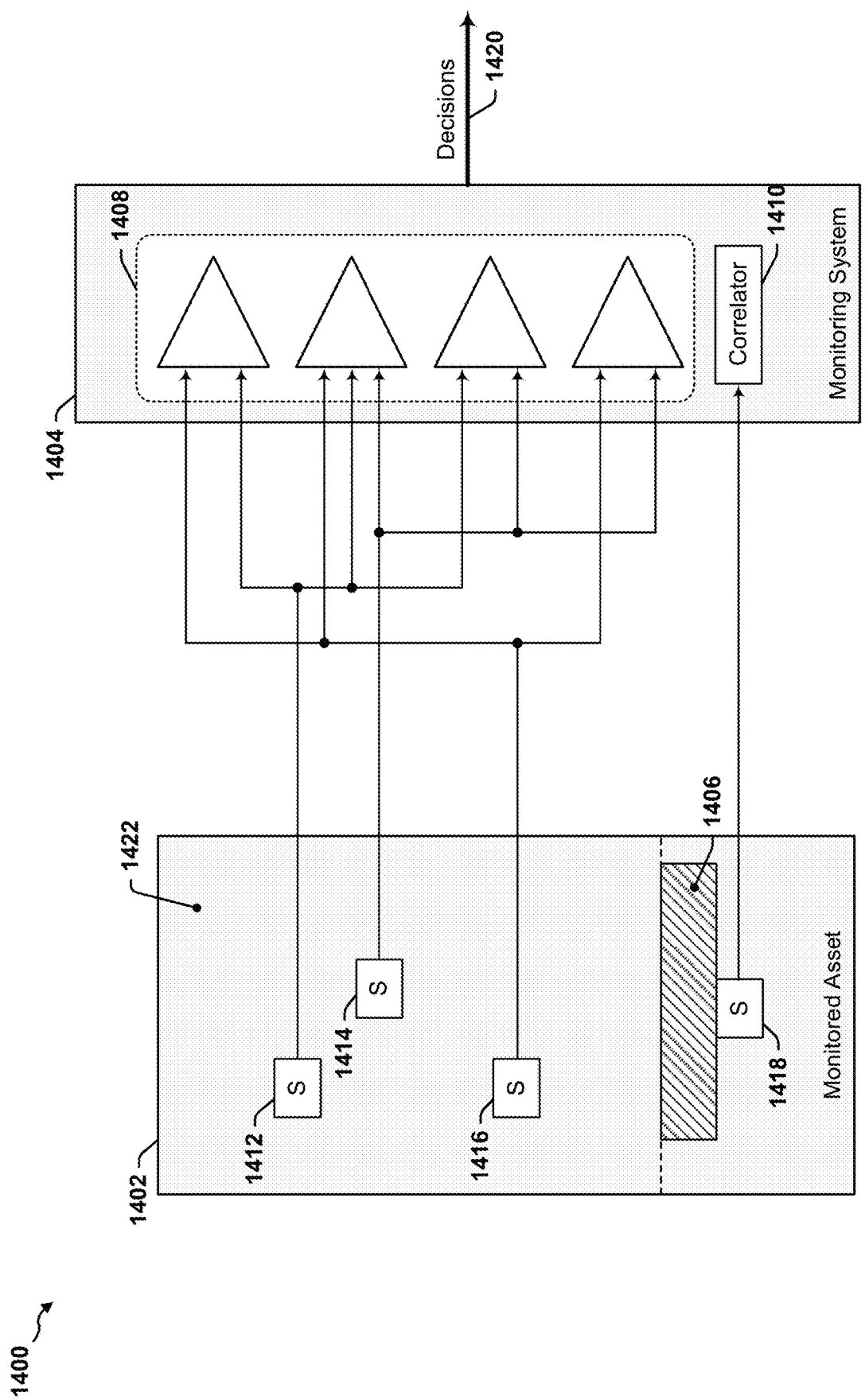
FIG. 14 illustrates certain aspects of a system that can be configured to calibrate and/or detect failure of sensors in accordance with certain aspects disclosed herein.

FIG. 14 illustrates certain aspects of a system 1400 that can be configured to calibrate and/or detect failure of sensors 1412, 1414, 1416 deployed to monitor an asset 1402. A failure or loss of calibration of a sensor can result in a false prediction or indication of failure in the monitored asset 1402, or can result in a failure to predict or indicate imminent failure of the monitored asset 1402. According to certain aspects disclosed herein, the illustrated system 1400 can be configured to improve reliability and confidence in the detection systems.

In certain examples, the monitored asset 1402 may be a refrigeration unit such as a freezer, an HVAC system, a facility that includes one or more HVAC system and/or multiple ULT freezers, or another type of apparatus or facility. For the purposes of this disclosure, the example of a monitored asset 1402 that includes an enclosed space 1422 that is cooled by a refrigeration unit 1406. The refrigeration unit 1406 may be provided within the enclosed space 1422, in another space within the monitored asset 1402, or external to the monitored asset 1402. In the illustrated example, the enclosed space 1422 is monitored using three sensors 1412, 1414, 1416 that may be nominally equivalent and that may be located in close proximity or provided at different locations within the enclosed space 1422.

In one example, the sensors 1412, 1414, 1416 measure temperature and, in an ideal case, produce the same temperature readings measured within the enclosed space 1422. In a practical implementation, the sensors 1412, 1414, 1416 may produce different output values. In some implementations, any two sensors 1412, 1414, 1416 may produce output values that are offset from one another due when placed in different locations within the enclosed space 1422. In some instances, any two sensors 1412, 1414, 1416 may produce output values that are offset from one another due to variations in location, operating characteristics caused by differences in manufacturing process, voltage and/or temperature (PVT). The offsets may be constant or proportional in size. Different sensors 1412, 1414, 1416 may exhibit different dynamic performance such that a first sensor 1412, 1414, 1416 may react at a different rate to changes in temperature than a second sensor 1412, 1414, 1416. Furthermore, differences in output values produced by collocated sensors 1412, 1414, 1416 may change over time.

According to certain aspects disclosed herein, a monitoring system 1404 may assess the condition of each sensor 1412, 1414, 1416 by comparing the output of the sensor 1412, 1414, 1416 with the output of other sensors 1412, 1414, 1416, 1418. In one example, the output of the three collocated temperature sensors 1412, 1414, 1416 may be compared to identify any variances in output. A voting system may be implemented that can be used to eliminate from consideration a measured value that is significantly different from the values produced by the other sensors 1412, 1414, 1416. When, for example, a first sensor 1412, 1414, 1416 fails suddenly, it may produce an output value that is significantly different from the values produced by the other sensors 1412, 1414, 1416 and comparison logic (e.g., a set of comparators 1408) may detect the difference and cause the output of the first sensor to be disregarded. In some instances, the output of the first sensor 1412, 1414, 1416 may be compared to the decision of the voting system at each sample event in order to determine whether the output of the first sensor 1412, 1414, 1416 should continue to be disregarded by the voting system.

Total failure of sensors 1412, 1414, 1416 may be less frequent than gradual degradation of performance. According to certain aspects disclosed herein, the health and/or performance of each sensor 1412, 1414, 1416 may be monitored by developing one or more profiles of the sensor 1412, 1414, 1416 with respect to other sensors 1412, 1414, 1416, 1418. In the illustrated example, the outputs of the three collocated sensors 1412, 1414, 1416 are compared, conceptually by the set of comparators 1408 that compares the outputs of different pairs of sensors 1412, 1414, 1416 to determine an offset between pairs of sensors 1412, 1414, 1416. Comparison between three or more sensors 1412, 1414, 1416 may be performed in support of a voting system and/or to produce an average of the output values produced by the collocated sensors 1412, 1414, 1416.

Offsets between values produced by pairs of sensors 1412, 1414, 1416 may be correlated with a baseline characteristic obtained for the monitored asset 1402. Variations in offset values may be characterized based on a cycle of temperature, thermodynamic refrigeration cycle or other cycle for which a baseline characteristic has been obtained or generated. A history of offset values may be obtained for pairs of sensors 1412, 1414, 1416 and trends in the historical offset values may be determined, such that the baseline characteristic may be updated. Decisions 1420 produced by the monitoring system 1404 may include a current temperature of the enclosed space 1422 obtained as an average, and/or by correcting differences between pairs of sensors 1412, 1414, 1416 using baseline offset characteristics. The monitoring system 1404 may also include alerts, warnings and alarms in the decisions 1420 that may relate to temperature levels in the enclosed space 1422, operation of the refrigeration unit 1406 and/or failure or impending failure of one or more sensors 1412, 1414, 1416.

Baseline characteristics may also be generated to characterize correlations between different types of sensors. In one example, correlation logic 1410 may be employed to correlate temperature values produced by collocated sensors 1412, 1414, 1416 and current, vibration, pressure, temperature or other measurements obtained from refrigeration unit 1406. The correlation logic 1410 may identify failures or other deviations of an individual sensor 1418 based on a baseline characteristic that correlates measurements obtained from one or more other sensors 1412, 1414, 1416, 1418.

In accordance with certain aspects of the disclosure, continuous or continual calibration processes may be employed in predictive failure monitoring systems and may be included in continuous validation system that satisfy requirements for accreditation by government and/or industry standards bodies. Accreditation for cold-storage installations and biorepository applications, refrigerators, ULT systems and liquid nitrogen storage tanks have been developed to ensure that high-value temperature-sensitive biological materials are properly stored. It is necessary to maintain continuously stable temperatures at multiple points inside the storage chamber.

Storage conditions may be regulated by internal or external policies, and temperature mapping and validation testing is typically required to be conducted at periodic intervals, such as at every six-months, one-year, two-years etc., on each cold-storage system. Temperature mapping and validation testing can assess and document the uniformity and stability of temperatures in comparison to published accreditation standards. Conventional validation testing can be expensive because it is labor intensive and requires the use of expensive test instrumentation and/or outsourced calibration services. The failure to have or maintain a validated system can result in loss of accreditation status, and can also result in the loss of high-value inventory or research material if temperature anomalies are not controlled. The use of the continuous or continual calibration processes disclosed herein can reduce the cost of achieving and maintaining compliance by 90% or more.

Certain aspects of the disclosure enable the automatic detection and correction of calibration errors. Continuous validation may be implemented using a model that can determine and confirm the accuracy of a measurement from one sensor under test based, a priori, upon its accuracy in correlation to each individual and the plurality of sensors comprising its peers. In certain implementations, covariance and "fit" or correlation can be used to measure and/or assess the relationship and the inter-dependencies between two or more variables, and the accuracy of the model increases in proportion to increases in the number of peers. The ability to determine the accuracy and confidence of each sensor 910, 912a-912c, 914 enables detection of sensor failure based on changes over time, including changes indicative of a loss of correlation. An alert detection may be produced when predefined or preconfigured thresholds are exceeded, indicating sensor failure. In some instances, a sensor 910, 912a-912c, 914 can be recalibrated programmatically without removal of the sensor and/or other manual or in-person intervention. Maintenance involving continuous and/or continual calibration procedures in accordance with certain aspects of this disclosure can be effectively performed more frequently than conventional processes and, in one example, may be performed on a daily basis.

Figure 15:
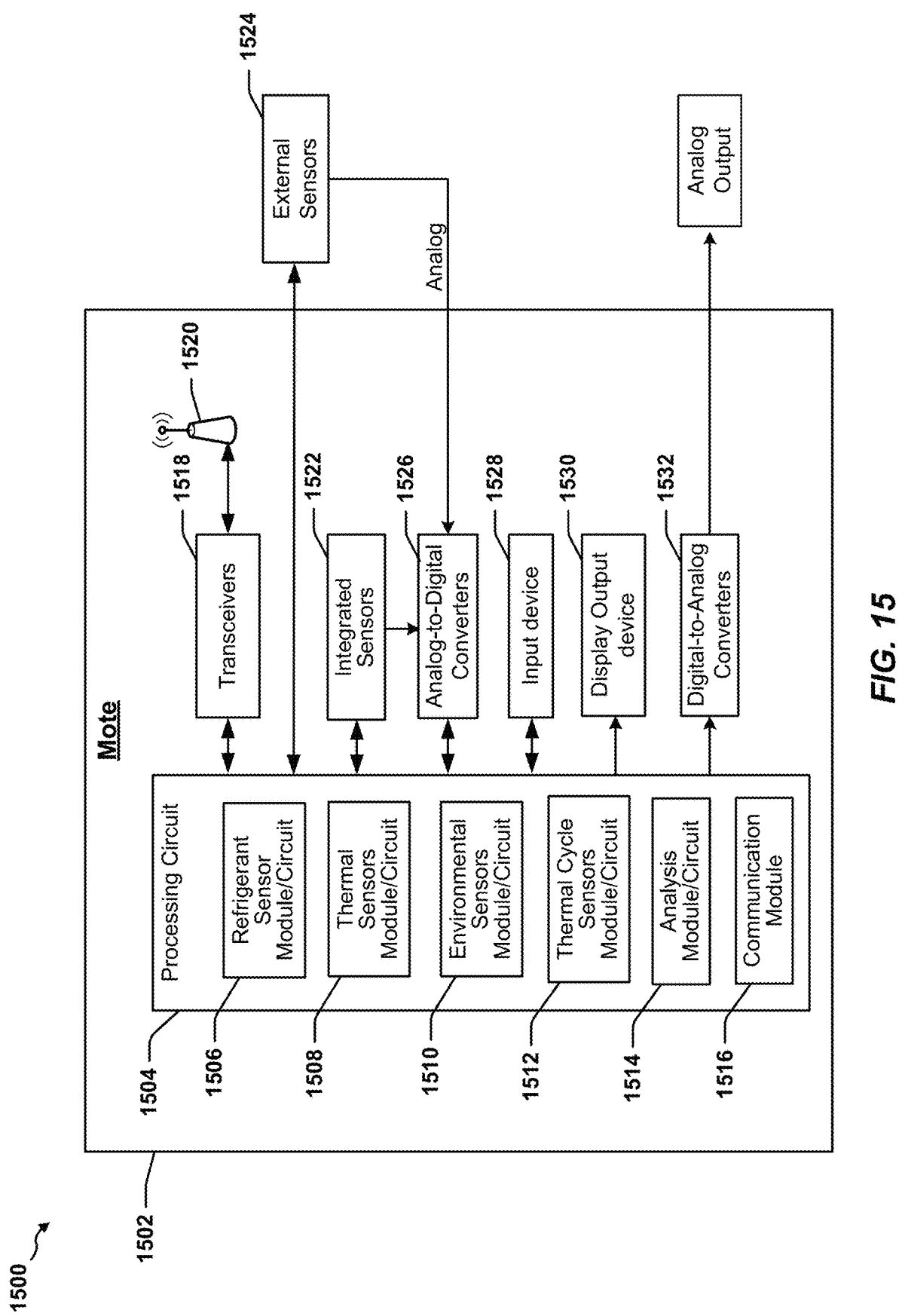
FIG. 15 illustrates an example of an architecture for a Mote configured in accordance with certain aspects disclosed herein.

FIG. 15 illustrates an example 1500 of an architecture for a Mote 1502. With continued reference to FIGS. 1-10, the Mote 1502 may be configured to connect to a network 830 by any suitable access technology. In one example, the Mote 1502 includes a processing circuit 1504 that may comprise one or more of a microprocessor, a microcontroller, a digital signal processor (DSP), sequencing logic, a state machine, and/or other such devices. The Mote 1502 and/or processing circuit may also include a variety of commonly used devices and components such as non-transitory storage, light emitting diode (LED) lamps or indicators, buttons or switches and/or an audible alarm indicator. The Mote 1502 may include a communications transceiver 1518 that includes radio frequency, optical or infrared transmitters and/or receivers. The Mote 1502 may communicate with one or more sensors 1522, 1524, including sensors 1522 that are incorporated in or integrated with the Mote 1502 and/or external sensors 1524 that may be coupled to the Mote 1502 using wired physical connectors and/or wireless communications. The Mote 1502 may additionally include a global positioning system receiver (not shown), a display controller 1530, and user input controllers or drivers 1528 that may interface with devices such as a keypad, touchscreen or the like.

The processing circuit 1504 may include one or more analog-to-digital (A/D) converters 1526 configured to receive analog inputs from one or more of the sensors 1522 and/or 1524 for example, and one or more digital-to-analog (D/A) converters 1532. The processing circuit 1504 may include one or more sensors 1522 and/or sensor control circuits. For example, certain sensors may be provided in an integrated circuit device, on a chip carrier or circuit board that carries the processing circuit 1504. The processing circuit 1504 may be configurable to connect to one or more external sensors 1524. The sensors 1522, 1524 may include transducers that can be used to sense or measure door position, pressure, acceleration, temperature, humidity, magnetic field, light, load, inclination, radio frequency identification (RFID) signals and or RFID return signals, whether related to a passive or active RFID tag. The processing circuit 1504 may include a battery or energy scavenging device and a wired, wireless, infrared, or magnetically coupled interface that is coupled to an antenna 1520 used for communications.

Figure 16:
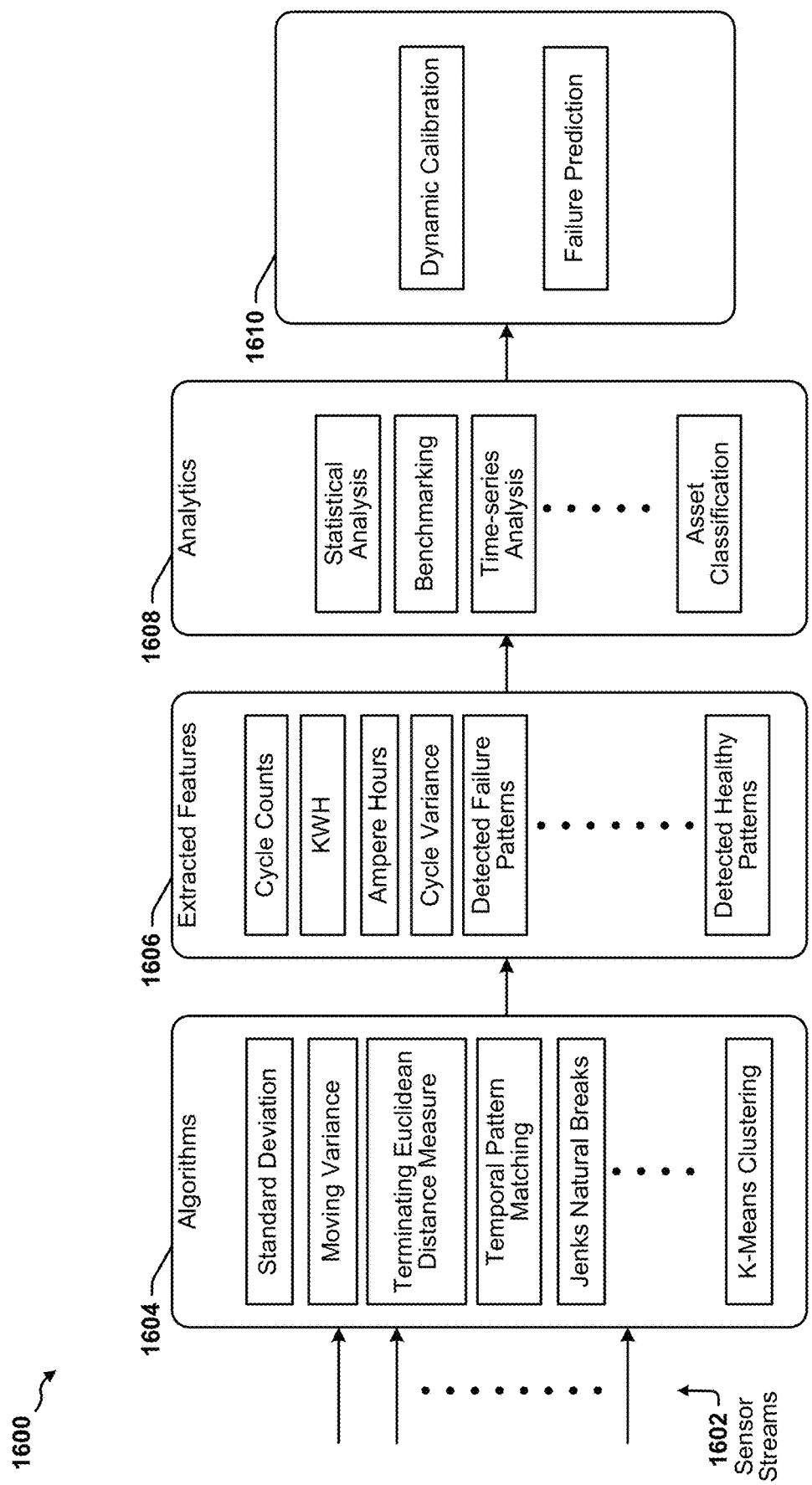
FIG. 16 is a data flow diagram that illustrates certain aspects of sensor data processing and analysis using sensor streams in accordance with certain aspects disclosed herein.

FIG. 16 is a data flow diagram 1600 that illustrates certain aspects of sensor data processing and analysis using sensor streams 1602. A sensor stream 1602 may comprise a time series of sensor data streamed from a sensor or replayed from storage. The sensor streams 1602 may be derived from sensor data provided by one or more Motes and may be processed using one or more algorithms 1604. The sensor data algorithms may include simple measures such as maximum and minimum alarm points, or more robust methods such as a standard deviation algorithm used to observe uniformity within windows of a sensor stream 1602. The algorithms may include a moving variance algorithm used to detect state changes in various elements of a system, including state changes in a compressor, for example. The algorithms may include a temporal pattern matcher algorithm configured to compare windows of sensor data for similarity scoring using one or more distance functions. The algorithms may include a terminating Euclidean distance measure algorithm or other simple distance function for pattern matching. The algorithms may include a Jenks natural breaks algorithm, a K-Means clustering algorithm or another clustering algorithm that provides a mechanism for clustering sensor data to separate states and/or to find aggregate values.

Certain features 1606 may be extracted from processing the sensor data. The features 1606 may include cycle counts indicating the number of compressor cycles in a configured period, based on amperage/energy sensor or other data. The features 1606 may include energy usage expressed as kilowatt-hours (kWh) or the like, and determined as the area under a power curve for a window of sensor data. Other values may be derived from energy usage including amperehours, for example. Ampere hours may be calculated using the formula Ampere Hours=kWh/(1000*volts). The features 1606 may include cycle variance, which may correspond to the variance in duration of cycles such as thermodynamic refrigeration cycles. Cycle variance may be used to indicate instability in a component or element of an asset when other factors remain stable. The features 1606 may include detected failure patterns, which may correspond to a Pattern ID that can be matched in a pattern matching process to identify a known issue associated with a pattern exhibited in the sensor data. The features 1606 may include detected healthy patterns, which may correspond to a Pattern ID that can be matched in a pattern matching process to identify expected behavior associated with a pattern exhibited in the sensor data.

Certain analytics methods 1608 may be applied to discover meaningful patterns and behaviors from the sensor data. A statistical analysis may be used to examine features as a sample from one or more like sensors to find population norms. Benchmarking may be employed to compare the features and/or characteristics of multiple sensors to determine the distribution of values within a population, and to use the corresponding percentile to score the feature of that asset. A time-series analysis may be applied to identify features for a single sensor over time, and/or to determine trends or changes, which may indicate the onset of failure. Asset classification may be used to classify or tag assets based on computed values, changes over time, etc. Asset classification may consider all data to determine if an asset should be tagged for repair, for example. Asset tags can be added or removed based on trends.

Other data may be considered in addition to the sensor data. In one example, a fusion of sensor data and disparate data elements may be employed to learn new things and to collect or categorize information in different ways and for different sources. For example, one or more sensors may be employed to monitor plug load energy consumption in a defined area such as in a room. Plug load energy is consequently an object that can be benchmarked in a manner similar to other objects such as compressors used in a refrigeration system. Such sensor data may be fused with other data to detect human activity and energy intensity in the area. In one example, the placement of additional equipment in the room may indicate a new use pattern for the area, or more or less water or lighting being used than before or in comparison to other objects. These new data from external sources may be mined to derive a better understanding of energy utilization relative to other monitored objects deemed to be similar or comparable.

One or more functions 1610 may be informed by the results produced by the analytics methods 1608. Dynamic calibration may be performed continuously and failure prediction states may be configured for each monitored asset. The failure prediction states may be communicated using a grading system that can be expressed graphically and/or textually. For example, a color-coding scheme may be applied to a graphical display indicating current performance metrics, such as power consumption, cycle variance, temperature curves, and the like. An asset may be graded using a configurable and/or familiar color-coding system (Green, Yellow and Red), such that the performance of each asset can be determined in comparison to known achievable levels of performance and energy efficiency to its peers (same make/model) in the population. Grading scores may be derived from sensor data obtained from sensors associated with assets deployed in a variety of settings, locations, and configurations.

In one example, assets performing within expectations may be color-coded as Green assets, while underperforming may be coded as Yellow or Red assets. A higher grade (Green) may indicate that the asset is deemed to be operating efficiently, and/or may be consuming less energy than the average of its peers. A next grade (Yellow) may indicate that the scored asset is exhibiting signs of stress and is consuming more energy than the average of its peers.

In one example, a proxy profile may be used to temporarily assign a make/model profile to an asset. An administrator may select a proxy, which represents a similar asset in terms of size, age and construction. Once it has been determined that the database contains a sufficiently large sample for the target make/model, then the proxy or the make/model group may be removed and the system may score the assets using the automated scoring methodology described above using empirical data.

A benchmark scoring process may be run automatically once per month and prior history is retained by the system such that asset grade changes, attributable to changes in asset performance, can be tracked over time for each individual asset.

Figure 17:
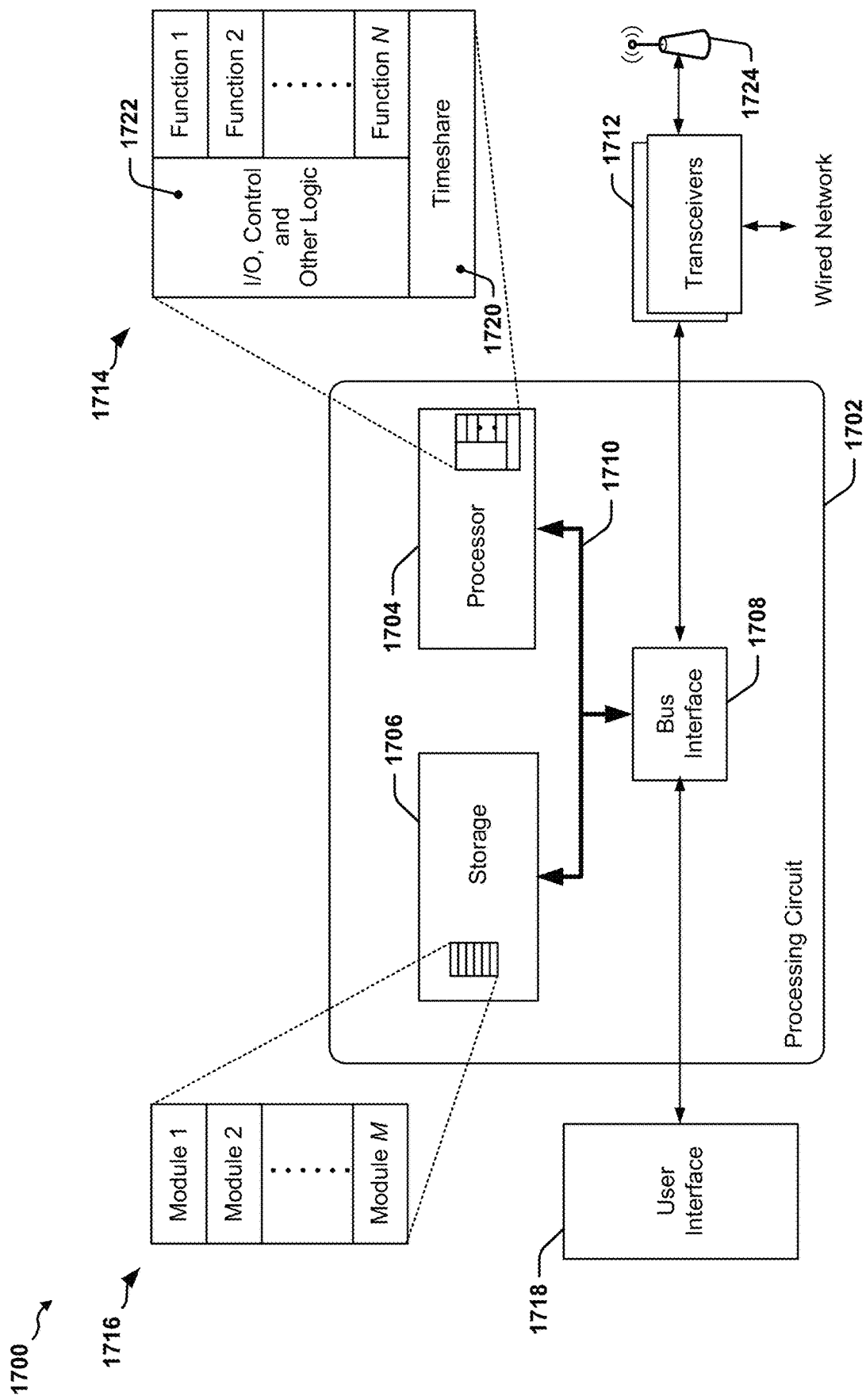
FIG. 17 illustrates an example of an apparatus employing a processing system that may be adapted according to certain aspects disclosed herein.

FIG. 17 is a conceptual diagram 1700 illustrating a simplified example of a hardware implementation for an apparatus employing a processing circuit 1702 that may be configured to perform one or more functions disclosed herein. In accordance with various aspects of the disclosure, an element, or any portion of an element, or any combination of elements as disclosed herein. The processing circuit 1702 may include one or more processors 1704 that are controlled by some combination of hardware and software modules.

Examples of processors 1704 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1704 may include specialized processors that perform specific functions, and that may be configured, augmented or controlled by one of the software modules 1716. For example, the processing circuit may be configured as communications processors and other processors that are adapted to handle encoding and decoding of data for transmission on one or more wired or wireless networks. The one or more processors 1704 may be configured through a combination of software modules 1716 loaded during initialization, and may be further configured by loading or unloading one or more software modules 1716 during operation.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. The bus 1710 links together various circuits including the one or more processors 1704, and storage 1706. Storage 1706 may include memory devices and mass storage devices, and may be referred to herein as computer-readable media. The bus 1710 may also link various other circuits such as timing sources, timers, peripherals, voltage regulators, and power management circuits. A bus interface 1708 may provide an interface between the bus 1710 and one or more line interface circuits or transceivers 1712. Transceivers 1712 may include encoders, decoders, and radio frequency transmitters and receivers that are used in communicating with various other apparatus over a wired or wireless network or through an opportunistic wireless connection. Depending upon the nature of the apparatus, a user interface 1718 (e.g., keypad, display, speaker, microphone, joystick) may also be provided, and may be communicatively coupled to the bus 1710 directly or through a bus interface 1708.

A processor 1704 may be responsible for managing the bus 1710 and for general processing that may include the execution of software stored in a computer-readable medium that may include the storage 1706. In this respect, the processing circuit 1702, including the processor 1704, may be used to implement any of the methods, functions and techniques disclosed herein. The storage 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1706 or in an external computer readable medium. The computer-readable medium and/or storage 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1706 may also include, by way of example, a carrier wave, a transmission line, and any other suitable medium for transmitting software and/or instructions that may be accessed and read by a computer. The computer-readable medium and/or the storage 1706 may reside in the processing circuit 1702, in the processor 1704, external to the processing circuit 1702, or be distributed across multiple entities including the processing circuit 1702. The computer-readable medium and/or storage 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein.

Some of the software modules 1716 may be loaded during initialization of the processing circuit 1702, and these software modules 1716 may configure the processing circuit 1702 to enable performance of the various functions disclosed herein. For example, some software modules 1716 may configure internal devices and/or logic circuits 1722 of the processor 1704, and may manage access to external devices such as the interfaces or transceivers 1712, the bus interface 1708, the user interface 1718, timers, mathematical coprocessors, and so on. The software modules 1716 may include a control program and/or an operating system that interacts with interrupt handlers and device drivers, and that controls access to various resources provided by the processing circuit 1702. The resources may include memory, processing time, access to the transceivers 1712, the user interface 1718, and so on.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceivers 1712, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

Figure 18:
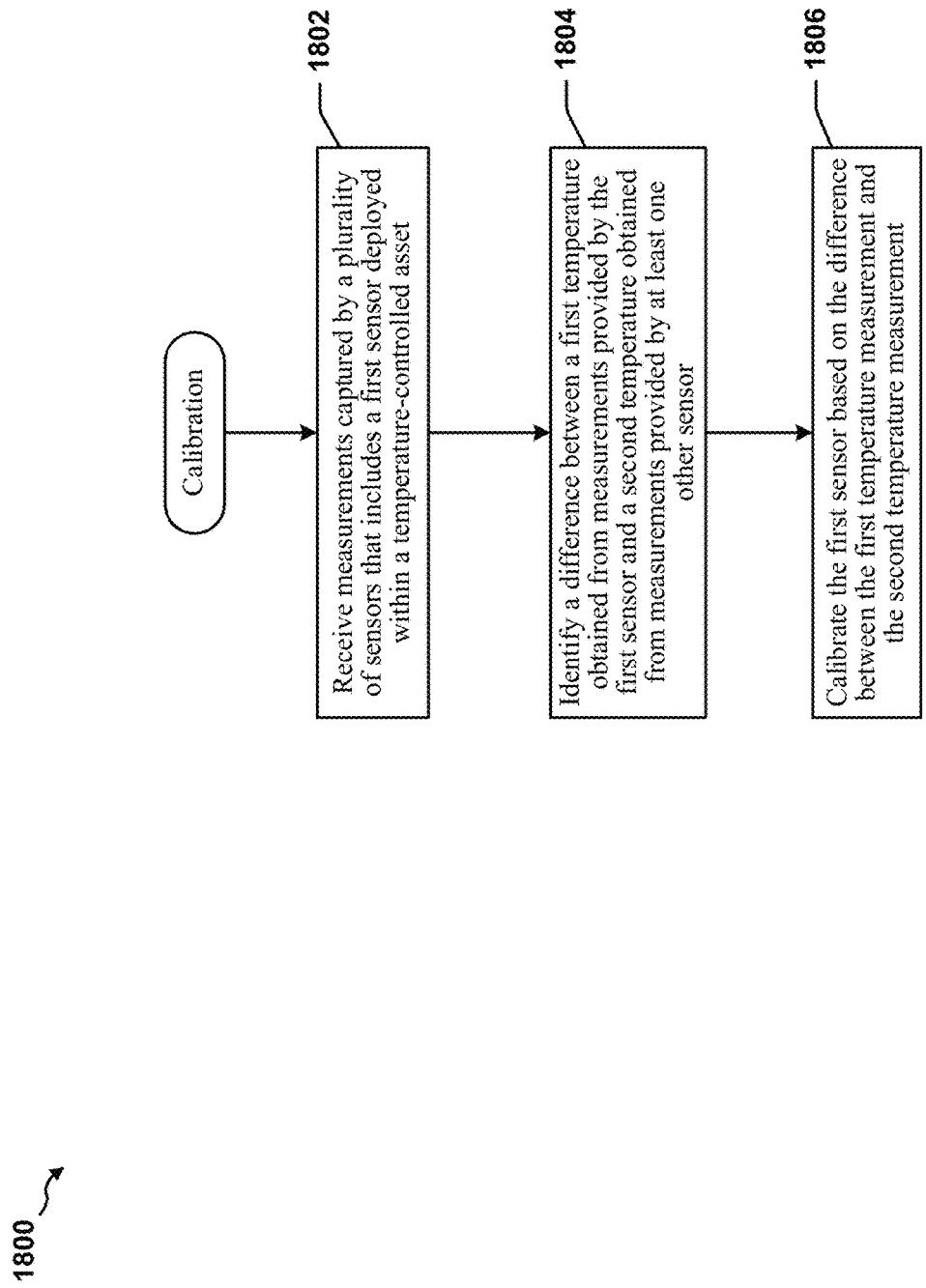
FIG. 18 is a flowchart illustrating a second example of a method of calibrating sensors in a refrigeration system.

FIG. 18 is a flowchart 1800 illustrating an example of a calibration process that may be performed in accordance with certain aspects disclosed herein. The calibration ay be performed by a monitoring system. The calibration may be based on or include a peer evaluation that may employ various machine learning and artificial intelligence techniques, including neural networks, means and population testing, pattern matching, autocorrelation, covariance, ANOVA, MANOVA, ARIMA, SARIMA or stepwise regression techniques or the like. These techniques may be employed to identify correlations among peers in a plurality of sensors, or with respect to other comparable assets or peer groups in a population. For each sensor under test, a model may be developed that can report overall fit, accuracy and confidence interval based upon correlation of the sensor under test with one or more of its peer sensors acting as a multi-variate or linear system. In one example, tests are configured to run periodically to determine if any of the sensors have lost correlation or fit.

At block 1802, the monitoring system may receive measurements captured by a plurality of sensors that includes a first sensor deployed within a temperature-controlled asset. In some examples, the measurements may be related to temperatures within a temperature-controlled chamber of one or more refrigeration assets. At block 1804, the monitoring system may identify a difference between a first temperature obtained from measurements provided by the first sensor and a second temperature obtained from measurements provided by at least one sensor. At block 1806, the monitoring system may calibrate the first sensor based on the difference between the first temperature measurement and the second temperature measurement. In one example, each sensor in the plurality of sensors is deployed within the temperature-controlled asset. In some examples, one or more sensors may be deployed in a different temperature-controlled asset, or may correspond to sensors in a modeled or simulated asset. In some examples, the second temperature measurement relates to a comparable asset, a peer group of assets, a population of assets or a simulated asset.

In one example, the second temperature comprises a baseline temperature obtained from measurements previously received from the first sensor. In another example, the second temperature is obtained from measurements provided by two or more other sensors. The monitoring system may determine that the first sensor is out of calibration when the measurements provided by the two or more sensors are consistent with one another and inconsistent with the measurements provided by the first sensor.

In one example, the monitoring system may identify the difference between the first temperature and the second temperature by performing a frequency domain analysis of the first temperature and the second temperature.

In certain examples, the monitoring system may determine that the first sensor is out of calibration based on measurements of current consumed by the refrigeration asset. The plurality of sensors may be calibrated prior to initial operation, and the monitoring system may calibrate differences in measurements provided by pairs of sensors in the plurality of sensors after calibration. The monitoring system may recalibrate the differences in measurements provided by the pairs of sensors after a change in conditions within the temperature-controlled chamber. The conditions within the temperature-controlled chamber may be changed when an object is added to the temperature-controlled chamber. The conditions within the temperature-controlled chamber may be changed when an object is removed from the temperature-controlled chamber. The conditions within the temperature-controlled chamber may be changed when an object is moved within the temperature-controlled chamber.

In certain examples, the monitoring system may determine a loss of calibration or accuracy of the first sensor based on a determination that the first sensor has lost correlation or covariance with its peers. The monitoring system may ignore measurements provided by the first sensor when the first sensor is determined to have lost correlation or covariance with a plurality of peer sensors and substitute the measurements provided by the first sensor with estimated measurements generated for the first sensor by the plurality of peer sensors, with the accuracy and confidence necessary to deem the substituted values acceptable, provided by the monitoring system.

In some instances, measurements captured at a plurality of refrigeration assets by one or more smart sensors, Motes, or smart modules may be configured to communicate the measurements through a datalogger. The data logger may be implemented using circuits or modules of the smart sensors, Motes, or smart modules. The datalogger may store or otherwise maintain sensor data and other information that can be communicated through a network after the datalogger has identified or established a network connection. In certain examples, information collected from smart sensors, Motes, or smart modules may be transmitted to an analysis system through a network at a predefined rate (e.g. every 4 or 8 minutes) as a bundle of observations made a faster rate (e.g., every 30 second or every minute), and/or at the earlier of a longer-term timer (1 hour) or alarm. In some examples, the datalogger, smart sensors, Motes, or smart modules may be adapted to execute one or more data processing algorithms using the sensor data. In some examples, the datalogger, smart sensors.

Figure 19:
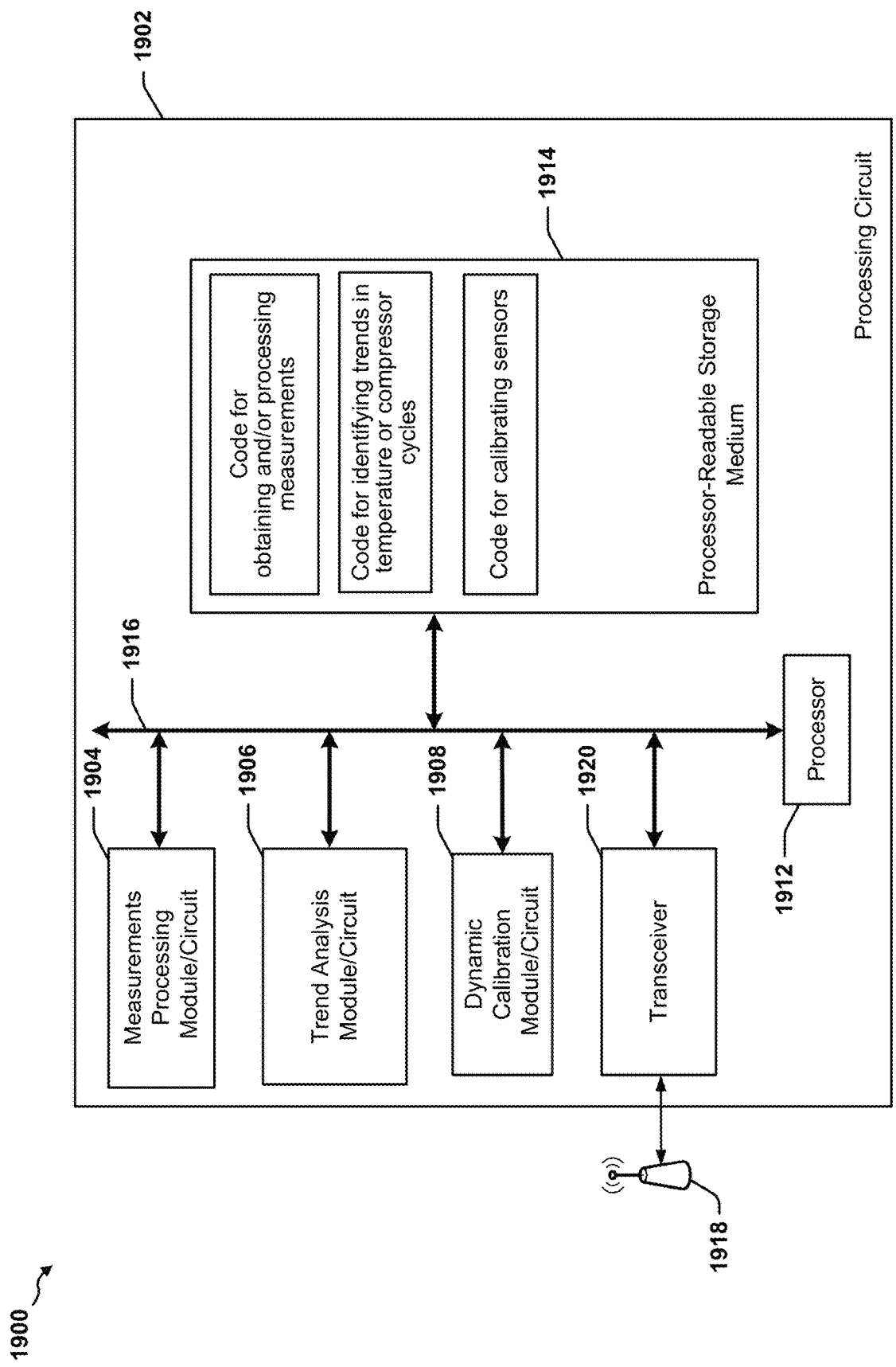
FIG. 19 is a diagram illustrating an example of a hardware implementation for an apparatus adapted to calibrate sensors in a refrigeration system.

FIG. 19 illustrates an example of a hardware implementation for an apparatus 1900 employing a processing circuit 1902. In this example, the processing circuit 1902 may be implemented with a bus architecture, represented generally by the bus 1916. The bus 1916 may include any number of interconnecting buses and bridges depending on the specific application of the processing circuit 1902 and the overall design constraints. The bus 1916 links together various circuits including one or more processors, represented generally by the processor 1912, and computer-readable media, represented generally by the processor-readable storage medium 1914. One or more timers may be connected to the bus and/or may be directly accessible or embodied in a processor 1912. The bus 1916 may also link various other circuits such as timing sources, timers, peripherals, voltage regulators, and power management circuits. One or more transceivers 1920 may provide wired communications, or wireless communications through the operation of at least one antenna 1918. Depending upon the nature of the apparatus, a user interface may be provided to support devices such as a keypad, a display, a speaker, a microphone, a joystick, and the like.

The processor 1912 is responsible for managing the bus 1916 and general processing, including the execution of software stored on the processor-readable storage medium 1914. The software, when executed by the processor 1912, causes the processing circuit 1902 to perform the various functions described supra for any particular apparatus. The processor-readable storage medium 1914 may be used for storing data that is manipulated by the processor 1912 when executing software. The processor-readable storage medium 1914 may also be used for storing system information related to one or more remotely managed devices (e.g. profiles), and the apparatus 1900 itself.

In one configuration the processing circuit 1902 may perform one or more functions in a system configured to monitor and/or manage a population of refrigeration systems. The processing circuit 1902 may include a module or circuit 1904 configured to receive and process measurements captured at a plurality of refrigeration assets, a module or circuit 1906 configured to determine trends in temperature or temperature cycles observed by multiple sensors, and a module or circuit 1908 configured to dynamically calibrate sensors.

In one implementation, an apparatus for managing refrigeration systems comprises one or more communication interfaces, a sensor interface circuit and a processing circuit. The communication interfaces may include a wireless communication interface configured to couple the apparatus to a wireless communication network. The sensor interface circuit may be configured to receive measurements captured by a plurality of sensors that includes a first sensor deployed within a temperature-controlled asset. The measurements may be related to temperatures within a temperature-controlled chamber of the refrigeration asset. The processing circuit may be configured to identify a difference between a first temperature obtained from measurements provided by the first sensor and a second temperature obtained from measurements provided by at least one other sensor, and calibrate the first sensor based on the difference between the first temperature measurement and the second temperature measurement.

In one example, the second temperature comprises a baseline temperature obtained from measurements previously received from the first sensor. In one example, the second temperature is obtained from measurements provided by two or more other sensors. The processing circuit may be configured to determine that the first sensor is out of calibration when the measurements provided by the two or more other sensors are consistent with one another and inconsistent with the measurements provided by the first sensor.

In some examples, the processing circuit is configured to perform a frequency domain analysis of the first temperature and the second temperature and identify the difference between the first temperature and the second temperature based on the frequency domain analysis.

In certain examples, the processing circuit may be configured to determine that the first sensor is out of calibration based on measurements of current consumed by the refrigeration asset. The processing circuit may be configured to calibrate the plurality of sensors prior to initial operation and calibrate differences in measurements provided by pairs of sensors in the plurality of sensors after calibration. The processing circuit may be configured to recalibrate the differences in measurements provided by the pairs of sensors after a change in conditions within the temperature-controlled chamber. Conditions within the temperature-controlled chamber may be changed when an object is added, removed or moved.

In certain examples, the processing circuit may be configured to determine a loss of calibration or accuracy of the first sensor based on a determination that the first sensor has lost correlation or covariance with its peers. The processing circuit may be configured to ignore measurements provided by the first sensor when the first sensor is determined to have lost correlation or covariance with a plurality of peer sensors and to substitute the measurements provided by the first sensor with estimated measurements generated for the first sensor by the plurality of peer sensors with the accuracy and confidence necessary to deem the substituted values acceptable.

The processor-readable storage medium 1914 may be configured with code that causes the processing circuit 1902 to receive measurements captured by a plurality of sensors that includes a first sensor deployed within a temperature-controlled asset, the measurements being related to temperatures within a temperature-controlled chamber of the refrigeration asset, identify a difference between a first temperature obtained from measurements provided by the first sensor and a second temperature obtained from measurements provided by at least one other sensor, and calibrate the first sensor based on the difference between the first temperature and the second temperature. In one example, each sensor in the plurality of sensors is deployed within the temperature-controlled asset. In some examples, one or more sensors may be deployed in a different temperature-controlled asset, or may correspond to sensors in a modeled or simulated asset. In some examples, the second temperature measurement relates to a comparable asset, a peer group of assets, a population of assets or a simulated asset.

In one example, the second temperature comprises a baseline temperature obtained from measurements previously received from the first sensor. In one example, the second temperature is obtained from measurements provided by two or more other sensors.

In certain examples, the code may cause the processing circuit 1902 to determine that the first sensor is out of calibration when the measurements provided by the two or more other sensors are consistent with one another and inconsistent with the measurements provided by the first sensor. In certain examples, the code may cause the processing circuit 1902 to identify the difference between the first temperature and the second temperature by performing a frequency domain analysis of the first temperature and the second temperature. The code may cause the processing circuit 1902 to determine that the first sensor is out of calibration based on measurements of current consumed by the refrigeration asset.

In certain examples, the code may cause the processing circuit 1902 to calibrate the plurality of sensors prior to initial operation and calibrate differences in measurements provided by pairs of sensors in the plurality of sensors after calibration. The code may cause the processing circuit 1902 to recalibrate the differences in measurements provided by the pairs of sensors after a change in conditions within the temperature-controlled chamber. Conditions within the temperature-controlled chamber are changed when an object is added to the temperature-controlled chamber. Conditions within the temperature-controlled chamber are changed when an object is removed from the temperature-controlled chamber. Conditions within the temperature-controlled chamber are changed when an object is moved within the temperature-controlled chamber.

In certain examples, the code may cause the processing circuit 1902 to determine a loss of calibration or accuracy of the first sensor based on a determination that the first sensor has lost correlation or covariance with its peers. The code may cause the processing circuit 1902 to ignore measurements provided by the first sensor when the first sensor is determined to have lost correlation or covariance with a plurality of peer sensors and to substitute the measurements provided by the first sensor with estimated measurements generated for the first sensor by the plurality of peer sensors with the accuracy and confidence necessary to deem the substituted values acceptable.

In accordance with certain aspects of the disclosure, a temperature sensing device includes one or more sensors attached to or embedded in a first layer. The temperature sensing device may be used during calibration of a sensor under test. The sensor under test may be calibrated using any of the methods or techniques disclosed herein, including the various methods described in relation to the flowchart 1800 of FIG. 18. In one example, the temperature sensing device is formed as a laminated device, where a second layer is attached to the first layer. The one or more sensors may be provided between the first layer and the second layer. In one example, the temperature sensing device may be configured for use as a shelf, wall, floor, ceiling or partition in a temperature-controlled asset. In another example, the temperature sensing device may be attached to or cover at least a portion of a shelf, wall, floor, ceiling or partition in a temperature-controlled asset. In the latter example, the temperature sensing device may be formed as a patch that can be placed at a desired location on the shelf, wall, floor, ceiling or partition in the temperature-controlled asset.

In one example, the sensor under test is included in the one or more sensors provided in the temperature sensing device. The temperature sensing device is placed in a temperature-controlled asset after the sensor under test is calibrated. In some instances, each of a plurality of sensors in the temperature sensing device is calibrated using the methods or techniques disclosed herein and the temperature sensing device may be placed in a temperature-controlled asset after at least one sensor under test is calibrated.

In another example, the temperature sensing device may include one or more pre-calibrated devices, and the temperature sensing device may be placed within a temperature-controlled asset to validate or calibrate the sensor under test. In some instances, the temperature sensing device may be removed from the temperature-controlled asset after the sensor under test has been calibrated.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one"

unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The word "exemplary" as used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of calibrating sensors, comprising:
receiving temperature measurements captured by a plurality of sensors deployed within a temperature-controlled asset, the plurality of sensors including a first sensor that has been calibrated with respect to the plurality of sensors during an initial calibration of the plurality of sensors; and
continuously recalibrating the plurality of sensors based on the temperature measurements, including recalibrating the first sensor when a difference is identified between temperature measurements in a time series of sensor data received from the first sensor and at least one other time series of sensor data received from the plurality of sensors.

2. The method of claim 1, further comprising:
determining a loss of calibration or accuracy of the first sensor based on a determination that the time series of sensor data received from the first sensor has lost correlation or covariance with one or more time series of sensor data received from its peers in the plurality of sensors.

3. The method of claim 1, further comprising:
ignoring measurements provided by the first sensor when the time series of sensor data received from the first sensor is determined to have lost correlation or covariance with a time series of sensor data received from a plurality of peer sensors in the plurality of sensors.

4. The method of claim 1, further comprising:
substituting measurements provided by the first sensor with estimated measurements generated for the first sensor by a plurality of peer sensors when the time series of sensor data received from the first sensor is determined to have lost correlation or covariance with time series of sensor data received from the plurality of peer sensors.

5. The method of claim 1, wherein the initial calibration is performed using a standards-certified thermometric device.

6. The method of claim 1, wherein the first sensor is recalibrated when differences between temperature measurements in the time series of sensor data received from the first sensor and temperature measurements in the at least one other time series of sensor data indicate a loss of sensitivity of the first sensor.

7. The method of claim 1, wherein the initial calibration is performed when a chamber of the temperature-controlled asset is empty.

8. The method of claim 7, wherein the initial calibration is performed when temperature within the chamber is stable.

9. The method of claim 7, wherein the initial calibration is performed while temperature measurements captured by two or more of the plurality of sensors are unchanging.

10. The method of claim 7, wherein the initial calibration is performed when temperature within the chamber varies over time.

11. The method of claim 10, wherein the initial calibration is performed using lag-adjusted temperatures provided by two or more of the plurality of sensors.

12. The method of claim 1, further comprising:
detecting a change in conditions within a chamber of the temperature-controlled asset based on differences in temperature measurements between multiple pairs of sensors in the plurality of sensors; and
recalibrating the plurality of sensors to account for the change in conditions within the chamber.

13. The method of claim 12, wherein the change in conditions within the chamber comprises an addition, relocation or removal of an object within the chamber.

14. The method of claim 1, wherein the first sensor is sandwiched between two laminating sheets to form a sensing device that is attached to a surface within a chamber of the temperature-controlled asset.

15. The method of claim 1, two or more of the plurality of sensors are sandwiched between two laminating sheets in a desired configuration to form a sensing device that is attached to a shelf within a chamber of the temperature-controlled asset.

16. The method of claim 1, two or more of the plurality of sensors are sandwiched between two laminating sheets in a desired configuration to form a sensing device that is attached to a surface within a chamber of the temperature-controlled asset.

17. A temperature sensing device, comprising:
a first sensor attached to a first layer of the temperature sensing device, wherein the first sensor is one of a plurality of sensors deployed within a temperature-controlled asset,
wherein the first sensor is calibrated with respect to other sensors in the plurality of sensors during an initial calibration of the plurality of sensors,
wherein the plurality of sensors is continuously recalibrated based on temperature measurements provided by the plurality of sensors, and
wherein the first sensor is recalibrated when a difference is identified between temperature measurements in a time series of sensor data received from the first sensor and at least one other time series of sensor data received from the plurality of sensors.

18. The temperature sensing device of claim 17, further comprising
a second layer attached to the first layer, wherein the first sensor is provided between the first layer and the second layer, and wherein the temperature sensing device is attached to or embedded in a surface within a chamber of the temperature-controlled asset.

19. The temperature sensing device of claim 17, further comprising
a second sensor attached to a first layer of the temperature sensing device, wherein the second sensor is included in the plurality of sensors deployed within the temperature-controlled asset.

20. A processor-readable storage medium configured with code that, when executed by a processor, causes the processor to:
receive temperature measurements captured by a plurality of sensors deployed within a temperature-controlled asset, the plurality of sensors including a first sensor that has been calibrated with respect to the plurality of sensors during an initial calibration of the plurality of sensors; and
continuously recalibrate the plurality of sensors based on the temperature measurements, wherein the first sensor is recalibrated when a difference is identified between temperature measurements in a time series of sensor data received from the first sensor and at least one other time series of sensor data received from the plurality of sensors.

* * * * *